(12) United States Patent
Ejima et al.

(10) Patent No.: US 12,398,822 B2
(45) Date of Patent: Aug. 26, 2025

(54) VALVE

(71) Applicant: EAGLE INDUSTRY CO., LTD., Tokyo (JP)

(72) Inventors: Takahiro Ejima, Tokyo (JP); Kenshiro Furukawa, Tokyo (JP); Kohei Fukudome, Tokyo (JP); Keigo Shirafuji, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 0 days.

(21) Appl. No.: 18/267,072

(22) PCT Filed: Dec. 6, 2021

(86) PCT No.: PCT/JP2021/044726
§ 371 (c)(1),
(2) Date: Jun. 13, 2023

(87) PCT Pub. No.: WO2022/131053
PCT Pub. Date: Jun. 23, 2022

(65) Prior Publication Data
US 2024/0011574 A1    Jan. 11, 2024

(30) Foreign Application Priority Data

Dec. 17, 2020    (JP) ................................ 2020-209652

(51) Int. Cl.
*F16K 31/06* (2006.01)
*F16K 1/46* (2006.01)
(Continued)

(52) U.S. Cl.
CPC ............ *F16K 31/0655* (2013.01); *F16K 1/46* (2013.01); *B60H 1/00485* (2013.01);
(Continued)

(58) Field of Classification Search
CPC .......... F16K 1/46; F16K 31/0655; F16K 1/34; F16K 31/0613; F16K 5/207;
(Continued)

(56) References Cited

U.S. PATENT DOCUMENTS

| 813,555 A | 2/1906 | Hayden | .................... F16K 1/34 |
| 821,758 A | 5/1906 | Smith | ....................... F16K 1/46 |

(Continued)

FOREIGN PATENT DOCUMENTS

| CN | 104520155 | 4/2015 | ............... B60T 8/36 |
| CN | 107339442 | 11/2017 | ............... F16K 1/02 |

(Continued)

OTHER PUBLICATIONS

Official Action issued in European related Application Serial No. 21853972.4, dated Jul. 24, 2024, 8 pages.
(Continued)

*Primary Examiner* — Craig J Price
(74) *Attorney, Agent, or Firm* — HAYES SOLOWAY P.C.

(57) ABSTRACT

There is provided a valve capable of reducing valve leakage. The valve includes: a valve housing in which ports through which a fluid passes are formed; a valve body configured to be driven by a drive source; a valve seat on which a contact portion of the valve body is seated; and biasing members for biasing the valve body in a valve closing direction. The valve seat is formed of an elastic member.

15 Claims, 9 Drawing Sheets

(51) Int. Cl.
  *B60H 1/00*  (2006.01)
  *F04B 27/18*  (2006.01)
  *F25B 41/345*  (2021.01)

(52) U.S. Cl.
  CPC ....... *F04B 27/1804* (2013.01); *F16K 31/0613* (2013.01); *F25B 41/345* (2021.01)

(58) Field of Classification Search
  CPC ................ F16K 17/087; F16K 31/126; F04B 2027/1818; F04B 2027/1831; F04B 2027/1859; F04B 27/1804; F04B 2027/1822–1881; B60H 1/00485; F25B 41/345
  USPC .......... 137/625.65; 417/222.2; 251/359–363, 251/129.15
  See application file for complete search history.

(56) References Cited

U.S. PATENT DOCUMENTS

| | | | | |
|---|---|---|---|---|
| 877,865 A | 1/1908 | Ricksecker | | F16K 1/34 |
| 1,170,412 A * | 2/1916 | Campbell | | F16K 15/20 |
| | | | | 251/359 |
| 1,449,876 A | 3/1923 | Erastus | | F01L 3/20 |
| 1,614,002 A | 1/1927 | Horton | | A62C 36/605 |
| 1,758,471 A | 5/1930 | Julius | | F16K 1/46 |
| 1,797,036 A * | 3/1931 | Wolf | | F16K 15/20 |
| | | | | 251/359 |
| 1,800,127 A | 4/1931 | Wilson | | F16K 1/34 |
| 1,847,385 A | 3/1932 | Franklin | | F16K 1/46 |
| 2,196,798 A | 4/1940 | Otto | | F16K 1/36 |
| 2,267,515 A | 12/1941 | Wilcox | | F16K 31/0627 |
| 2,331,503 A | 10/1943 | Ray | | F16K 41/10 |
| 2,543,010 A * | 2/1951 | Gardner | | F16K 31/0655 |
| | | | | 315/108 |
| 2,797,061 A | 6/1957 | Buchanan | | F16K 31/06 |
| 2,887,293 A | 5/1959 | Fred | | F16K 31/60 |
| 2,893,685 A | 7/1959 | Camp | | F16K 1/36 |
| 2,898,082 A | 8/1959 | Von Almen | | F04B 53/1027 |
| 3,049,332 A | 8/1962 | Webster | | F16K 1/02 |
| 3,054,422 A | 9/1962 | Napolitano | | F16K 1/385 |
| 3,070,120 A | 12/1962 | Wendt | | F16K 1/46 |
| 3,185,438 A | 5/1965 | Smirra | | F16K 1/34 |
| 3,204,925 A | 9/1965 | Enrico | | F16K 1/50 |
| 3,230,973 A | 1/1966 | Rudolf | | F16K 1/46 |
| 3,278,156 A | 10/1966 | Callahan | | F16K 41/10 |
| 3,360,304 A | 12/1967 | Adams | | B61K 7/12 |
| 3,394,732 A | 7/1968 | Constantine | | F16K 1/36 |
| 3,426,741 A | 2/1969 | Haagen | | F01L 3/02 |
| 3,483,888 A | 12/1969 | Hugo | | F16K 15/046 |
| 3,623,699 A * | 11/1971 | Matousek | | F16K 1/46 |
| | | | | 251/368 |
| 3,627,257 A | 12/1971 | Stamfil | | F16K 31/0693 |
| 3,679,169 A | 7/1972 | Bedo | | F16K 41/02 |
| 3,854,495 A | 12/1974 | Cowley | | G05D 16/0663 |
| 4,085,921 A | 4/1978 | Ueda et al. | | F16K 31/06 |
| 4,149,699 A | 4/1979 | Speckmann | | F16K 41/00 |
| 4,318,532 A | 3/1982 | Winkler | | F16K 1/34 |
| 4,345,739 A | 8/1982 | Wheatley | | F16K 1/2263 |
| 4,364,615 A | 12/1982 | Euler | | F16C 27/04 |
| 4,417,601 A | 11/1983 | Bennett | | A62C 31/12 |
| 4,448,038 A | 5/1984 | Barbier | | F25B 41/34 |
| 4,474,356 A | 10/1984 | Baumann | | F16K 1/12 |
| 4,579,145 A | 4/1986 | Leiber | | F16H 61/0251 |
| 4,615,358 A | 10/1986 | Hammond | | F15B 13/0402 |
| 4,617,889 A | 10/1986 | Nishimiya | | F02D 31/00 |
| 4,632,358 A | 12/1986 | Orth | | F25B 41/347 |
| 4,669,272 A * | 6/1987 | Kawai | | F04B 49/225 |
| | | | | 417/270 |
| 4,687,419 A * | 8/1987 | Suzuki | | F04B 27/1804 |
| | | | | 417/270 |
| 4,778,150 A | 10/1988 | Pratt | | F16K 41/043 |
| 4,813,647 A * | 3/1989 | Yagi | | F02M 3/075 |
| | | | | 251/129.05 |
| 4,825,909 A | 5/1989 | Martin | | F15B 13/02 |
| 4,848,729 A | 7/1989 | Danzy | | F16K 1/46 |
| 4,895,192 A | 1/1990 | Mortenson | | F01M 11/04 |
| 4,915,355 A | 4/1990 | Fort | | F16K 1/46 |
| 4,917,150 A | 4/1990 | Koch | | F16K 31/0606 |
| 4,921,208 A | 5/1990 | LaMarca | | F16K 31/0693 |
| 4,922,957 A | 5/1990 | Johnson | | F16K 1/46 |
| 4,923,173 A | 5/1990 | Szymaszek | | F16K 1/36 |
| 4,936,337 A * | 6/1990 | DuHack | | F16K 31/408 |
| | | | | 137/329.04 |
| 4,979,542 A | 12/1990 | Mesenich | | F02M 47/027 |
| 4,998,559 A | 3/1991 | McAuliffe | | F16H 61/0251 |
| 5,011,116 A | 4/1991 | Alberts | | F16K 47/00 |
| 5,060,695 A | 10/1991 | McCabe | | G05D 16/2024 |
| 5,217,047 A | 6/1993 | McCabe | | F16H 16/0251 |
| 5,232,195 A | 8/1993 | Torrielli | | H01F 7/1607 |
| 5,246,205 A | 9/1993 | Gillingham | | F01N 3/0212 |
| 5,263,694 A | 11/1993 | Smith | | B60G 15/068 |
| 5,364,066 A | 11/1994 | Dorste | | F25B 41/35 |
| 5,409,036 A * | 4/1995 | Ahmadian | | H01F 7/14 |
| | | | | 137/625.65 |
| 5,439,027 A | 8/1995 | Layton | | F16K 1/385 |
| 5,702,235 A | 12/1997 | Hirota | | F04B 27/1804 |
| 5,778,932 A | 7/1998 | Alexander | | G05D 16/2024 |
| 5,797,730 A * | 8/1998 | Kawaguchi | | F04B 49/225 |
| | | | | 417/295 |
| 5,810,030 A * | 9/1998 | Uchiyama | | F16K 31/0655 |
| | | | | 251/129.07 |
| 5,897,096 A * | 4/1999 | Nakano | | F16K 41/103 |
| | | | | 251/65 |
| 6,010,312 A | 1/2000 | Suitou | | F04B 27/1804 |
| 6,019,118 A | 2/2000 | Voggenreiter et al. | | |
| | | | | F16K 51/02 |
| 6,149,398 A * | 11/2000 | Fukanuma | | F04B 27/1804 |
| | | | | 184/6.17 |
| 6,155,391 A | 12/2000 | Kashiwagi et al. | | F16F 9/348 |
| 6,161,585 A | 12/2000 | Kolchinsky | | F05D 16/2024 |
| 6,257,836 B1 | 7/2001 | Ota et al. | | 417/222.02 |
| 6,280,152 B1 * | 8/2001 | Sugiura | | F04B 27/0891 |
| | | | | 417/269 |
| 6,315,266 B1 | 11/2001 | Hirota | | F16K 31/406 |
| 6,321,995 B1 | 11/2001 | Badovick | | F25B 41/335 |
| 6,361,283 B1 | 3/2002 | Ota | | F04B 27/1084 |
| 6,443,420 B1 | 9/2002 | Hettinger | | F16K 31/02 |
| 6,481,976 B2 | 11/2002 | Kimura | | F04B 27/1804 |
| 6,517,324 B2 * | 2/2003 | Ota | | F04B 27/1804 |
| | | | | 62/228.5 |
| 6,626,000 B1 | 9/2003 | Meyer | | F25B 41/345 |
| 6,772,990 B2 * | 8/2004 | Sasaki | | F16K 31/0627 |
| | | | | 62/228.3 |
| 6,776,182 B2 | 8/2004 | Ishitoya | | F16K 25/00 |
| 6,811,140 B1 | 11/2004 | Maini | | F16K 1/46 |
| 6,840,504 B2 | 1/2005 | Hagiwara | | F16K 1/36 |
| 6,959,718 B2 | 11/2005 | Kayahara | | F16K 31/0655 |
| 7,007,917 B2 | 3/2006 | Choi | | F16K 31/0655 |
| 7,040,595 B2 | 5/2006 | Hirota | | F16K 31/02 |
| 7,246,787 B2 * | 7/2007 | Kumar | | F16K 31/0675 |
| | | | | 251/282 |
| 7,481,417 B2 | 1/2009 | Mayer | | F16K 51/02 |
| 7,533,687 B2 | 5/2009 | Uemura | | F16K 27/048 |
| 7,562,675 B2 * | 7/2009 | Nomichi | | F16K 1/443 |
| | | | | 137/625.48 |
| 7,726,949 B2 | 6/2010 | Taguchi | | F04B 1/26 |
| 7,758,014 B2 | 7/2010 | Lancaster | | F16K 1/04 |
| 7,832,653 B2 | 11/2010 | Yukimoto | | F25B 41/39 |
| 7,958,908 B2 | 6/2011 | Cho et al. | | F15B 13/044 |
| 7,971,797 B2 | 7/2011 | Habermann | | F16K 31/002 |
| 8,021,124 B2 | 9/2011 | Umemura | | F16K 27/048 |
| 8,079,827 B2 | 12/2011 | Iwa | | F04B 27/1804 |
| 8,128,061 B2 | 3/2012 | Uemura | | F04B 27/0442 |
| 8,225,818 B1 | 7/2012 | Stephens | | F15B 13/0442 |
| 8,328,163 B2 | 12/2012 | Boesch | | F16K 1/36 |
| 8,387,947 B2 | 3/2013 | Uemura | | F04B 27/1804 |
| 8,434,518 B2 * | 5/2013 | Okamoto | | F16K 31/0655 |
| | | | | 137/625.69 |
| 8,469,337 B1 | 6/2013 | Hoeptner | | F16K 1/36 |
| 8,579,257 B2 | 11/2013 | Taylor | | F16K 1/46 |
| 8,651,826 B2 | 2/2014 | Futakuchi | | F04B 27/1804 |

(56) References Cited

U.S. PATENT DOCUMENTS

| | | | |
|---|---|---|---|
| 8,684,037 B2 | 4/2014 | Huynh | F15B 13/01 |
| 8,757,592 B2 | 6/2014 | Marica | F16K 31/00 |
| 8,757,988 B2 * | 6/2014 | Fukudome | F04B 27/1804 417/270 |
| 9,022,346 B2 | 5/2015 | Najmolhoda | F16K 31/0613 |
| 9,027,598 B2 | 5/2015 | Schneider | F16K 31/0613 |
| 9,132,714 B2 | 9/2015 | Futakuchi | F04B 27/1804 |
| 9,243,733 B2 | 1/2016 | Lively | G05D 16/02 |
| 9,297,373 B2 | 3/2016 | Bagagli | F16K 15/026 |
| 9,383,021 B2 | 7/2016 | Kosmehl | F16K 1/36 |
| 9,400,027 B2 | 7/2016 | Imaizumi | F16F 1/32 |
| 9,453,518 B2 | 9/2016 | Schulz | F15B 13/043 |
| 9,470,337 B2 | 10/2016 | Roper | F16K 1/36 |
| 9,581,149 B2 | 2/2017 | Ota et al. | F04B 27/1804 |
| 9,581,150 B2 | 2/2017 | Ota et al. | F04B 18/04 |
| 9,638,082 B2 | 5/2017 | Fujita | F16K 25/00 |
| 9,732,874 B2 * | 8/2017 | Saeki | F04B 27/1804 |
| 9,874,286 B2 | 1/2018 | Bagagli | F16K 15/12 |
| 10,113,539 B2 * | 10/2018 | Sugamura | F04B 27/1804 |
| 10,378,657 B2 | 8/2019 | Lin | F16K 1/46 |
| 10,519,944 B2 | 12/2019 | Taguchi | F04B 27/1804 |
| 10,557,463 B2 | 2/2020 | Sugamura | F04B 27/1804 |
| 10,690,125 B2 | 6/2020 | Hayama | F04B 27/18 |
| 10,784,804 B2 | 9/2020 | Sasaki | H02P 25/022 |
| 10,837,431 B2 * | 11/2020 | Tonegawa | F16K 31/0613 |
| 11,085,431 B2 | 8/2021 | Fukudome et al. | F16K 31/06 |
| 11,092,244 B1 | 8/2021 | Hu | F16K 1/36 |
| 11,313,475 B2 * | 4/2022 | Lv | F25B 41/35 |
| 11,415,238 B2 * | 8/2022 | Nakanishi | F16K 31/0655 |
| 11,480,166 B2 | 10/2022 | Hayama et al. | F04B 27/10 |
| 11,519,399 B2 * | 12/2022 | Kurihara | F04B 53/1087 |
| 11,536,389 B2 * | 12/2022 | Fukudome | F16K 31/0655 |
| 11,542,929 B2 * | 1/2023 | Hayama | F04B 27/18 |
| 11,542,931 B2 * | 1/2023 | Hayama | G05D 7/005 |
| 11,555,489 B2 * | 1/2023 | Hayama | F04B 27/10 |
| 11,603,832 B2 * | 3/2023 | Higashidozono | F16K 31/0655 |
| 12,018,663 B2 * | 6/2024 | Kurihara | F16K 15/184 |
| 12,025,237 B2 * | 7/2024 | Kurihara | F04B 27/1804 |
| 12,031,531 B2 * | 7/2024 | Fukudome | F16K 31/0655 |
| 12,196,464 B2 * | 1/2025 | Ejima | B60H 1/00485 |
| 12,292,130 B2 * | 5/2025 | Ejima | F16K 27/18 |
| 2001/0003573 A1 | 6/2001 | Kimura et al. | 417/222.2 |
| 2002/0134444 A1 | 9/2002 | Isobe | F16K 27/041 |
| 2003/0145615 A1 | 8/2003 | Sasaki | F16K 31/0637 |
| 2003/0197141 A1 | 10/2003 | Kajitani | F16L 47/00 |
| 2003/0202885 A1 | 10/2003 | Taguchi | F04B 49/00 |
| 2004/0045305 A1 | 3/2004 | Murase | F25B 49/022 |
| 2004/0165994 A1 | 8/2004 | Umemura | F04B 27/1804 |
| 2005/0076959 A1 | 4/2005 | Yamamoto | F16K 31/0624 |
| 2005/0151310 A1 | 7/2005 | Rodeffer | F16F 1/32 |
| 2005/0163624 A1 | 7/2005 | Taguchi | F04B 27/1804 |
| 2007/0214814 A1 | 9/2007 | Umemura et al. | |
| 2007/0264134 A1 | 11/2007 | Hirota | F04B 27/1804 |
| 2008/0138213 A1 | 6/2008 | Umemura et al. | 417/222.2 |
| 2008/0175727 A1 | 7/2008 | Umemura et al. | F04B 49/22 |
| 2009/0108221 A1 | 4/2009 | Umemura et al. | 251/129.15 |
| 2009/0114871 A1 | 5/2009 | Iwa | F04B 27/14 |
| 2009/0183786 A1 | 7/2009 | Iwa | 137/487.5 |
| 2009/0256091 A1 | 10/2009 | Nordstrom | F16K 31/0613 |
| 2010/0051838 A1 | 3/2010 | Uemura | F04B 27/1804 |
| 2010/0252763 A1 | 10/2010 | Courth | F16K 31/0665 |
| 2010/0282991 A1 | 11/2010 | Okamoto | F16K 31/02 |
| 2011/0041941 A1 | 2/2011 | Sonsterod | F16K 15/14 |
| 2011/0061749 A1 * | 3/2011 | Okamoto | F16K 31/0655 137/492.5 |
| 2011/0089352 A1 | 4/2011 | Morgan | F16K 11/0716 |
| 2011/0203888 A1 | 8/2011 | Sonsterod | F16F 9/32 |
| 2012/0056113 A1 | 3/2012 | Tano | F04B 27/1804 |
| 2012/0097881 A1 * | 4/2012 | Aoyama | F16K 1/425 251/359 |
| 2012/0198992 A1 | 8/2012 | Futakuchi et al. | 91/505 |
| 2012/0198993 A1 | 8/2012 | Fukudome | 91/505 |
| 2012/0211686 A1 | 8/2012 | Okamoto | F16K 31/0655 |
| 2013/0291963 A1 | 11/2013 | Futakuchi et al. | 137/487.5 |
| 2014/0099214 A1 | 4/2014 | Fukudome | 417/222.2 |
| 2014/0109973 A1 | 4/2014 | Neumeister | C23C 16/4412 |
| 2014/0130916 A1 | 5/2014 | Saeki | F16K 31/0613 |
| 2014/0294632 A1 | 10/2014 | Kondo et al. | 417/434 |
| 2014/0369862 A1 | 12/2014 | Ota et al. | F04B 27/1804 |
| 2015/0004010 A1 | 1/2015 | Saeki | F04B 27/1804 |
| 2015/0021131 A1 | 1/2015 | Wootten | F16F 9/348 |
| 2015/0027573 A1 | 1/2015 | Ochiai | F15B 14/0402 |
| 2015/0044067 A1 | 2/2015 | Ota et al. | F04B 27/1804 |
| 2015/0060708 A1 * | 3/2015 | Glime, III | F16K 31/1225 251/335.1 |
| 2015/0068628 A1 | 3/2015 | Iwa | 137/625.65 |
| 2015/0104334 A1 | 4/2015 | Ota et al. | F04B 27/1804 |
| 2015/0275874 A1 | 10/2015 | Ota | F04B 27/1804 |
| 2015/0276065 A1 | 10/2015 | Yoshida | F16K 3/246 |
| 2015/0345655 A1 | 12/2015 | Higashidozono | 137/624.27 |
| 2016/0053755 A1 | 2/2016 | Taguchi | F04B 49/22 |
| 2016/0208954 A1 | 7/2016 | Ito et al. | F16K 39/02 |
| 2016/0290326 A1 | 10/2016 | Sugamura | F04B 27/1804 |
| 2017/0261113 A1 | 9/2017 | Sato | F16K 31/0675 |
| 2017/0284562 A1 | 10/2017 | Hayama | F16K 41/00 |
| 2018/0156345 A1 | 6/2018 | Kanda | F15B 13/0431 |
| 2018/0187793 A1 | 7/2018 | Futakuchi | F04B 39/08 |
| 2018/0238455 A1 | 8/2018 | Yazawa | F16K 31/508 |
| 2018/0291888 A1 | 10/2018 | Tonegawa et al. | F04B 49/22 |
| 2018/0372129 A1 * | 12/2018 | Kato | F15B 13/0402 |
| 2019/0162175 A1 | 5/2019 | Higashidozono | F04B 27/18 |
| 2019/0293061 A1 | 9/2019 | Kume | F16K 11/048 |
| 2020/0011444 A1 | 1/2020 | Morita et al. | F16K 31/04 |
| 2020/0032781 A1 | 1/2020 | Higashidozono | F16K 31/0624 |
| 2020/0088178 A1 | 3/2020 | Fukudome et al. | F16K 31/06 |
| 2020/0173580 A1 | 6/2020 | Sandeck | F16K 51/02 |
| 2020/0309105 A1 | 10/2020 | Hayama et al. | F04B 27/18 |
| 2020/0318624 A1 | 10/2020 | Hayama | F04B 27/18 |
| 2020/0325881 A1 | 10/2020 | Hayama et al. | F04B 27/18 |
| 2020/0332786 A1 | 10/2020 | Hayama | F04B 27/1804 |
| 2020/0362974 A1 | 11/2020 | Hayama et al. | F16K 11/24 |
| 2020/0370545 A1 | 11/2020 | Hayama et al. | F04B 27/18 |
| 2021/0372396 A1 | 12/2021 | Kurihara | G05D 7/0635 |
| 2021/0404570 A1 | 12/2021 | Hayama et al. | F16K 17/04 |
| 2022/0213878 A1 | 7/2022 | Fukudome et al. | F04B 27/18 |

FOREIGN PATENT DOCUMENTS

| | | | |
|---|---|---|---|
| CN | 209146387 | 7/2019 | F16K 31/42 |
| CN | 110260001 | 9/2019 | F16K 15/016 |
| CN | 110735965 | 1/2020 | F16K 1/00 |
| CN | 111279076 | 6/2020 | F04B 27/18 |
| CN | 111316028 | 6/2020 | F16K 31/06 |
| CN | 111417780 | 7/2020 | F04B 27/18 |
| DE | 2414893 | 10/1975 | F16K 15/00 |
| DE | 2706439 | 8/1978 | F16K 11/04 |
| DE | 10039066 | 2/2002 | F16K 31/06 |
| DE | 102006033747 | 1/2008 | F16K 31/00 |
| EP | 0229315 | 7/1987 | F02M 3/07 |
| EP | 1519128 | 3/2005 | F25B 41/06 |
| EP | 2180217 | 4/2010 | F16K 31/06 |
| EP | 2594794 | 5/2013 | F04B 27/18 |
| EP | 3056778 | 8/2016 | F16K 31/04 |
| EP | 3258103 | 12/2017 | F04B 27/18 |
| EP | 3296599 | 3/2018 | F16K 1/34 |
| EP | 3366957 | 8/2018 | F16K 1/34 |
| EP | 3726054 | 10/2020 | F04B 27/18 |
| JP | 5682358 | 7/1981 | G03B 15/00 |
| JP | 5740945 | 8/1982 | B21B 39/14 |
| JP | H04171361 | 6/1992 | F04B 49/00 |
| JP | 5346276 | 12/1993 | F25B 41/96 |
| JP | 626454 | 2/1994 | F04B 27/08 |
| JP | H0711313 | 2/1995 | F16K 1/34 |
| JP | H8159320 | 6/1996 | F16K 31/04 |
| JP | H09144931 | 6/1997 | F16K 31/06 |
| JP | H10220926 | 8/1998 | F25B 41/06 |
| JP | 11287281 | 10/1999 | F16F 9/348 |
| JP | 200020763 | 8/2000 | F16K 31/06 |
| JP | 2000304152 | 11/2000 | F16D 48/02 |
| JP | 2001012534 | 1/2001 | F16F 9/46 |
| JP | 2001501290 | 1/2001 | F16K 31/06 |
| JP | 2001153495 | 6/2001 | F16K 31/06 |
| JP | 2001153498 | 6/2001 | F16K 31/06 |
| JP | 2001165055 | 6/2001 | F04B 27/14 |

(56) References Cited

FOREIGN PATENT DOCUMENTS

| | | | |
|---|---|---|---|
| JP | 2001263527 | 9/2001 | ............ F16K 31/06 |
| JP | 2002216803 | 8/2002 | ............ H01M 8/02 |
| JP | 2003004160 | 1/2003 | ............ F16K 31/04 |
| JP | 2003301772 | 10/2003 | |
| JP | 2003314745 | 11/2003 | ............ F16K 51/02 |
| JP | 2003322086 | 11/2003 | ............ F04B 49/00 |
| JP | 2004003468 | 1/2004 | ............ F04B 27/14 |
| JP | 2004101163 | 4/2004 | ............ F25B 41/06 |
| JP | 2005307817 | 11/2005 | ............ F04B 27/14 |
| JP | 2005351605 | 12/2005 | ............. F16K 1/38 |
| JP | 2006153204 | 6/2006 | ............ F16K 31/04 |
| JP | 2007247512 | 9/2007 | ............ F04B 27/14 |
| JP | 2008157031 | 7/2008 | ............ F04B 27/14 |
| JP | 2008190574 | 8/2008 | ............ F16K 31/06 |
| JP | 2009030752 | 2/2009 | ............ F16K 31/06 |
| JP | 2009115204 | 5/2009 | ............ F16K 31/04 |
| JP | 2009221965 | 10/2009 | ............ F04B 27/14 |
| JP | 2009257523 | 11/2009 | ............ F16K 31/06 |
| JP | 2009275550 | 11/2009 | ............ F04B 49/00 |
| JP | 2010019406 | 1/2010 | ............ F16K 31/04 |
| JP | 2011501798 | 1/2011 | ............ F16K 15/14 |
| JP | 2011525962 | 9/2011 | ............... F16F 9/32 |
| JP | 4822735 | 11/2011 | ............ A43B 23/24 |
| JP | 2012144986 | 8/2012 | ............ F04B 27/14 |
| JP | 2012211579 | 11/2012 | ............ F04B 27/14 |
| JP | 2013024135 | 2/2013 | ............ F04B 27/14 |
| JP | 5167121 | 3/2013 | ............ F04B 27/14 |
| JP | 2013100915 | 5/2013 | ............ F15K 31/06 |
| JP | 2013194918 | 9/2013 | ............. F16K 1/36 |
| JP | 2014080927 | 5/2014 | ............ F04B 27/16 |
| JP | 2014092207 | 5/2014 | ............ F16K 31/06 |
| JP | 2014095463 | 5/2014 | ............ F16K 31/06 |
| JP | 2015075054 | 4/2015 | ............ F04B 27/14 |
| JP | 20151168 | 5/2015 | ............ F04B 27/14 |
| JP | 2015137546 | 7/2015 | ............ F04B 27/14 |
| JP | 2015178795 | 10/2015 | ............ F04B 27/14 |
| JP | 5983539 | 8/2016 | ............ F04B 27/18 |
| JP | 2016196825 | 11/2016 | ............ F04B 27/18 |
| JP | 2016196876 | 11/2016 | ............ F04B 27/18 |
| JP | 2016205404 | 12/2016 | ............ F04B 27/18 |
| JP | 6135521 | 5/2017 | ............ F04B 27/18 |
| JP | 2017089832 | 5/2017 | ............ F16K 31/06 |
| JP | 2017180525 | 10/2017 | ............ F16K 31/04 |
| JP | 2017219060 | 12/2017 | ............ F16K 37/00 |
| JP | 2018015739 | 2/2018 | ................ C02F 1/46 |
| JP | 2018035840 | 5/2018 | |
| JP | 2018115684 | 7/2018 | ............ B60G 17/08 |
| JP | 2018179087 | 11/2018 | ............ F16K 31/06 |
| JP | 2019002436 | 1/2019 | ............... F16K 3/26 |
| JP | 2019131725 | 8/2019 | |
| JP | 2019138473 | 8/2019 | ............... F16K 1/36 |
| JP | 2019167982 | 10/2019 | ............... F16K 1/38 |
| JP | 2019183960 | 10/2019 | ............ F16K 31/06 |
| JP | 2020041606 | 3/2020 | ............... F16K 1/44 |
| JP | 2020060108 | 4/2020 | ............ F04B 27/18 |
| KR | 20-0400543 | 10/2005 | ................ B60S 1/52 |
| KR | 1020050107244 | 11/2005 | ............ F16K 17/10 |
| WO | WO9218795 | 10/1992 | ............... F16K 1/34 |
| WO | WO2006090760 | 8/2006 | ............ F04B 27/18 |
| WO | WO2007119380 | 10/2007 | ............ F04B 27/14 |
| WO | WO2009025298 | 2/2009 | ............ F16K 31/06 |
| WO | WO2011114841 | 9/2011 | ............ F04B 27/14 |
| WO | WO2011132438 | 10/2011 | ............ F16K 31/06 |
| WO | WO2012077439 | 6/2012 | ............ F04B 27/14 |
| WO | WO2014119594 | 8/2014 | ............ F04B 27/14 |
| WO | WO2014148367 | 9/2014 | ............ F16K 31/06 |
| WO | WO2018124156 | 7/2018 | ............ F16K 31/06 |
| WO | WO2019131482 | 7/2019 | ............ F04B 27/18 |
| WO | WO2020110925 | 11/2019 | ............ F04B 27/18 |
| WO | WO2020013169 | 1/2020 | ............ F04B 27/18 |
| WO | WO2020218284 | 10/2020 | ............ F04B 27/18 |

OTHER PUBLICATIONS

Official Action issued in European related Application Serial No. 21872539.8, dated Sep. 3, 2024, 5 pages.
Official Action issued in European related Application Serial No. 21875395.2, dated Sep. 13, 2024, 7.
Official Action issued in European related Application Serial No. 21853139.0, dated Mar. 22, 2024, 15 pages.
Official Action issued in European related Application Serial No. 21852577.2, dated Mar. 22, 2024, 9 pages.
Official Action issued in European related Application Serial No. 21853892.4, dated Mar. 22, 2024, 8 pages.
Official Action issued in European related Application Serial No. 21854468.2, dated Jul. 24, 2024, 7 pages.
Official Action issued in European related Application Social No. 01853073 2. dated Jul. 25, 2024, 7 pages.
Official Action issued in Korean related Application Serial No. 10-2023-7004906, dated Jun. 17, 2024, 10 pages with English Translation.
Official Action issued in Korean related Application Serial No. 10-2023-7004905, dated Jun. 17, 2024, 10 pages with English Translation.
Official Action issued in Korean related Application Serial No. 10-2023-7011145, dated Jun. 18, 2024, 6 pages with English Translation.
Official Action issued in Korean related Application Serial No. 10-2023-7004093, dated Jun. 17, 2024, 11 pages with English Translation.
Official Action issued in Korean related Application Serial No. 10-2023-7020969, dated Jun. 21, 2024, 8 pages with English Translation.
Official Action issued in related U.S. Appl. No. 18/019,230, dated Apr. 25, 2024, 11 pages.
Official Action issued in related U.S. Appl. No. 18/019,066, dated Apr. 24, 2024, 6 pages.
Official Action issued in related U.S. Appl. No. 18/029,065, dated Apr. 23, 2024, 14 pages.
Official Action issued in related U.S. Appl. No. 18/017,825, dated Apr. 15, 2024, 15 pages.
Official Action issued in related U.S. Appl. No. 18/017,824, dated Mar. 13, 2024, 19 pages.
Official Action issued in related U.S. Appl. No. 18/019,060, dated Apr. 26, 2024, 6 pages.
Official Action issued in related U.S. Appl. No. 18/029,065, dated Aug. 6, 2024, 10 pages.
Official Action issued in related U.S. Appl. No. 18/019,066, dated Sep. 5, 2024, 7 pages.
Official Action issued in related U.S. Appl. No. 18/019,060, dated Sep. 5, 2024, 7 pages.
Official Action issued in related U.S. Appl. No. 18/027,599, dated Jun. 13, 2024, 16 pages.
Notice of Allowance issued in related U.S. Appl. No. 18/022,465, dated Apr. 25, 2024, 7 pages.
International Search Report and Written Opinion and International Preliminary Report on Patentability issued in PCT/JP2022/012340, dated May 31, 2022, 24 pages.
International Search Report and Written Opinion and International Preliminary Report on Patentability issued in PCT/JP2021/027769, dated Sep. 7, 2021, 24 pages.
International Search Report and Written Opinion and International Preliminary Report on Patentability issued in PCT/JP2021/027762, dated Oct. 5, 2021, 20 pages.
International Search Report and Written Opinion and International Preliminary Report on Patentability issued in PCT/JP2021/027766, dated Sep. 7, 2021, 24 pages.
International Search Report and Written Opinion and International Preliminary Report on Patentability issued in PCT/JP2021/027770, dated Oct. 5, 2021, 20 pages.
International Search Report and Written Opinion and International Preliminary Report on Patentability issued in PCT/JP2021/027772, dated Sep. 21, 2021, 24 pages.

(56) References Cited

OTHER PUBLICATIONS

International Search Report and Written Opinion and International Preliminary Report on Patentability issued in PCT/JP2021/027767, dated Sep. 7, 2021, 22 pages.
International Search Report and Written Opinion and International Preliminary Report on Patentability issued in PCT/JP2021/030007, dated Nov. 2, 2021, 18 pages.
International Search Report and Written Opinion and International Preliminary Report on Patentability issued in PCT/JP2021/034996, dated Dec. 12, 2021, 18 pages.
International Search Report and Written Opinion and International Preliminary Report on Patentability issued in PCT/JP2021/034990, dated Oct. 19, 2021, 18 pages.
International Search Report and Written Opinion and International Preliminary Report on Patentability issued in PCT/JP2021/034995, dated Dec. 14, 2021, 16 pages.
International Search Report and Written Opinion and International Preliminary Report on Patentability issued in PCT/JP2021/044726, dated Dec. 28, 2021, 22 pages.
Search Report issued in European related Application Serial No. 21906416.9, dated Oct. 22, 2024, 8 pages.
Official Action issued in Japanese related Application Serial No. 2022-541458, dated Oct. 15, 2024, 6 pages with English Translation.
Official action issued in related U.S. Appl. No. 18/019,230, dated Oct. 15, 2024, 13 pages.
Official action issued in related U.S. Appl. No. 18/019,057, dated Sep. 27, 2024, 11 pages.

* cited by examiner

VALVE

TECHNICAL FIELD

The present invention relates to a valve that variably controls a working fluid, for example, to a valve that controls a discharge amount of a variable capacity compressor used for an air conditioning system of an automobile according to pressure.

BACKGROUND ART

A variable capacity compressor used for an air conditioning system of an automobile, etc. includes a rotating shaft to be rotationally driven by an engine, a swash plate coupled to the rotating shaft in such a manner that a tilt angle is variable, compressing pistons coupled to the swash plate, etc., and by changing the tilt angle of the swash plate, changes a stroke amount of the pistons to control a discharge amount of fluid. This tilt angle of the swash plate can be continuously changed by appropriately controlling pressure in a control chamber while utilizing a suction pressure Ps of a suction chamber that suctions the fluid, a discharge pressure Pd of a discharge chamber that discharges the fluid pressurized by the pistons, and a control pressure Pc of the control chamber that houses the swash plate, by means of a capacity control valve as a valve that is driven to open and close by electromagnetic force of a solenoid as a drive source.

At the time of continuously driving the variable capacity compressor, the capacity control valve performs normal control in which energization is controlled by a control computer, a valve body is moved in an axial direction by electromagnetic force generated in the solenoid, and a flow passage between a discharge port and a control port is opened and closed by a valve to adjust the control pressure Pc of the control chamber of the variable capacity compressor.

In addition, there is a capacity control valve that controls a flow rate of the fluid flowing from the control port to a suction port. For example, in a capacity control valve disclosed in Patent Citation 1, in an open state of the valve in which the solenoid is energized, the fluid flows to the suction port through a through-flow passage communicating with the control port inside a housing. When the solenoid is de-energized from the open state, a valve body having a rod shape can be moved toward a valve seat by biasing force of a bellows to close the through-flow passage, the valve seat being formed in the valve housing. In such a manner, pressure in the control chamber of the variable capacity compressor is controlled using a pressure difference between the control pressure Pc and the suction pressure Ps lower than the control pressure Pc.

CITATION LIST

Patent Literature

Patent Citation 1: WO 2020/218284 A (Pages 11 to 13, FIG. 4)

SUMMARY OF INVENTION

Technical Problem

In the capacity control valve of Patent Citation 1, a contact portion having a tapered shape is formed such that one end of the valve body is tapered, and comes into contact with and is seated on the valve seat formed on an inner peripheral surface of the valve housing, through a wide surface. However, operation in which the valve body returns toward the valve seat from an open state is due to biasing force of the bellows, and return force of the valve body that depends on biasing force of the bellows is small. For this reason, in a case where contaminations are caught between the contact portion of the valve body and the valve seat when the valve is closed, the contaminations are not completely crushed, and a gap occurs between the contact portion of the valve body and the valve seat and becomes a cause of valve leakage, which is a problem.

The present invention is conceived in view of such a problem, and an object of the present invention is to provide a valve capable of reducing valve leakage.

Solution to Problem

In order to solve the foregoing problem, a valve according to the present invention includes: a valve housing in which a port through which a fluid passes is formed; a valve body to be driven by a drive source; a valve seat on which a contact portion of the valve body is seated; and a biasing member configured to bias the valve body in a valve closing direction or the valve. At least one of the contact portion of the valve body and the valve seat is formed of an elastic member. According to the aforesaid feature of the present invention, when the valve is closed, even in a case where contaminations are caught between the contact portion of the valve body and the valve seat, the elastic member can be elastically deformed to suppress generation of a gap between the contact portion and the valve seat, so that valve leakage can be reduced.

It may be preferable that the contact portion of the valve body or the valve seat that comes into contact with a contact surface of the elastic member is formed of an annular projection and the elastic member is formed to have a modulus of elasticity smaller than a modulus of elasticity of the annular projection. According to this preferable configuration, when the valve is closed, even in a case where contaminations are caught between the annular projection and the contact surface of the elastic member, the elastic member can be reliably and elastically deformed to suppress generation of a gap between the contact portion and the valve seat, so that valve leakage can be reduced.

It may be preferable that the contact surface is a surface orthogonal to a driving direction of the valve body. According to this preferable configuration, when the valve is closed, since it is difficult for the annular projection to relatively move with respect to the contact surface of the elastic member, sealability is enhanced, and damage to the contact surface of the elastic member caused by the annular projection is suppressed, so that sealability can be maintained over a long period of time.

It may be preferable that the valve body or the valve housing is provided with an annular recessed portion and the elastic member inserted into the annular recessed portion is crimped and fixed from at least one of radially inner and outer sides. According to this preferable configuration, the elastic member inserted into the annular recessed portion can be prevented from coming off.

It may be preferable that the elastic member has a rectangular cross section. According to this preferable configuration, even when the annular projection comes into contact with the contact surface of the elastic member at any position, stable elasticity can be provided.

It may be preferable that the valve body is separately configured to come into contact with and to separate from a rod forming the drive source and the rod is biased in a valve opening direction by a rod biasing member. According to this preferable configuration, since the rod is held so as to be able to come into contact with and to separate from the valve body in a state where the rod is biased in the valve opening direction, when the valve is closed, the valve body is not affected by an inertial force of the rod, so that an excessive load can be prevented from being applied to the contact portion or to the valve seat.

It may be preferable that the biasing member is a compression spring. According to this preferable configuration, a structure on a drive source side of the valve is simplified, and the contact portion of the valve body is seated on the valve seat while the structure is such that an axis of the valve body is easily offset, so that good sealability can be obtained.

DESCRIPTION OF EMBODIMENTS

Figure 1:
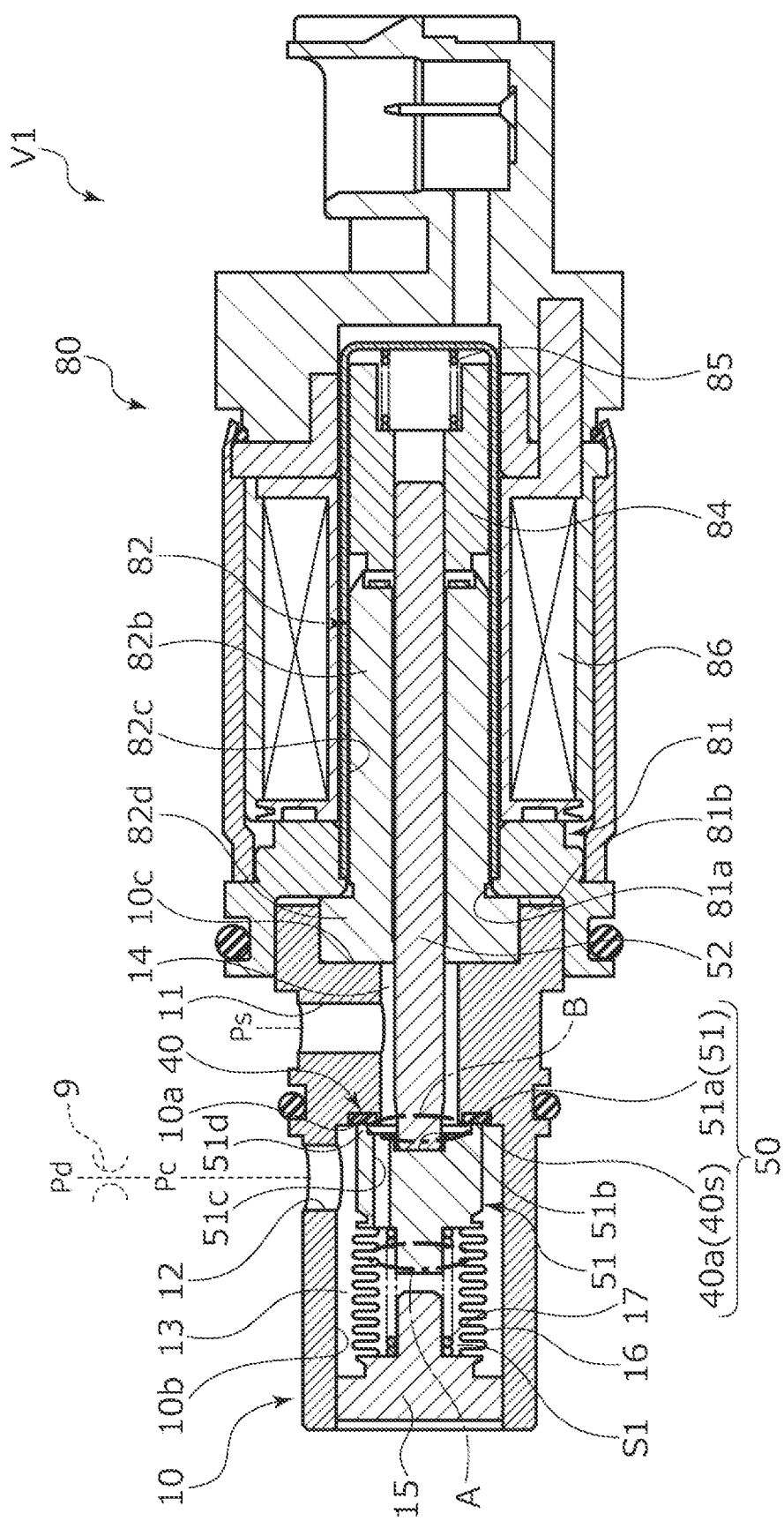
FIG. 1 is a cross-sectional view illustrating a structure of a capacity control valve as a valve according to a first embodiment of the present invention.

Modes for implementing a valve according to the present invention will be described below based on embodiments. Incidentally, in the embodiments, a capacity control valve will be described as an example but the present invention is also applicable to other uses such as an expansion valve.

First Embodiment

A capacity control valve as a valve according to a first embodiment of the present invention will be described with reference to FIGS. 1 to 3. Hereinafter, left and right sides when viewed from the front side of FIG. 1 will be described as being left and right sides of the capacity control valve. Specifically, the left side of the drawing sheets on which a valve housing 10 is disposed and the right side of the drawing sheets on which a solenoid 80 is disposed will be described as being the left side of the capacity control valve and the right side of the capacity control valve, respectively.

The capacity control valve of the present invention is assembled into a variable capacity compressor (not illustrated) used for an air conditioning system of an automobile, etc., and variably controls pressure of a working fluid (hereinafter, simply referred to as a "fluid") that is a refrigerant. Accordingly, the capacity control valve controls a discharge amount of the variable capacity compressor to adjust the air conditioning system to a target cooling capacity.

First, the variable capacity compressor will be described. The variable capacity compressor includes a casing including a discharge chamber, a suction chamber, a control chamber, and a plurality of cylinders. Incidentally, the variable capacity compressor is provided with a communication passage that provides direct communication between the discharge chamber and the control chamber. The communication passage is provided with a fixed orifice 9 that balances the pressures of the discharge chamber and the control chamber (refer to FIG. 1).

In addition, the variable capacity compressor includes a rotating shaft, a swash plate, and a plurality of pistons. The rotating shaft is rotationally driven by an engine (not illustrated) installed outside the casing. The swash plate is coupled to the rotating shaft so as to be tiltable with respect to the rotating shaft by a hinge mechanism in the control chamber. The plurality of pistons are coupled to the swash plate and are reciprocatably fitted in the respective cylinders. A capacity control valve V1 is driven to open and close by electromagnetic force, so that pressure in the control chamber of a variable capacity compressor is appropriately controlled using a suction pressure Ps of the suction chamber that suctions the fluid, a discharge pressure Pd of the discharge chamber that discharges the fluid pressurized by the pistons, and a control pressure Pc of the control chamber that houses the swash plate. Accordingly, a tilt angle of the swash plate changes continuously. Accordingly, a stroke amount of the pistons is changed, so that a discharge amount of the fluid from the variable capacity compressor is controlled.

As illustrated in FIG. 1, the capacity control valve V1 of the first embodiment assembled into the variable capacity compressor adjusts an electric current that energizes a coil 86 forming the solenoid 80 as a drive source, to perform opening and closing control of a CS valve 50 in the capacity control valve V1. Accordingly, the fluid flowing out from the control chamber to the suction chamber is adjusted to variably control the control pressure Pc in the control chamber. Incidentally, a discharge fluid of the discharge pressure Pd of the discharge chamber is constantly supplied to the control chamber via the fixed orifice 9, and the CS valve 50 in the capacity control valve V1 is closed, so that the control pressure Pc in the control chamber is increased.

In the capacity control valve V1 of the first embodiment, the CS valve 50 is formed of a CS valve body 51 as a valve body and a CS valve seat 40a as a valve seat. The CS valve seat 40a is formed on an elastic member 40 that is press-fitted and crimped and fixed to an annular recessed portion 10a of the valve housing 10. A contact portion 51a formed at an axially right end of the CS valve body 51 comes into contact with and separates from the CS valve seat 40a in an axial direction to open and close the CS valve 50.

Next, a structure of the capacity control valve V1 will be described. As illustrated in FIG. 1, the capacity control valve V1 mainly includes the valve housing 10 made of a metallic material; the CS valve body 51 disposed to be reciprocatable in the axial direction inside the valve housing 10; and the solenoid 80 connected to the valve housing 10 to exert a driving force on the CS valve body 51.

Figure 2:
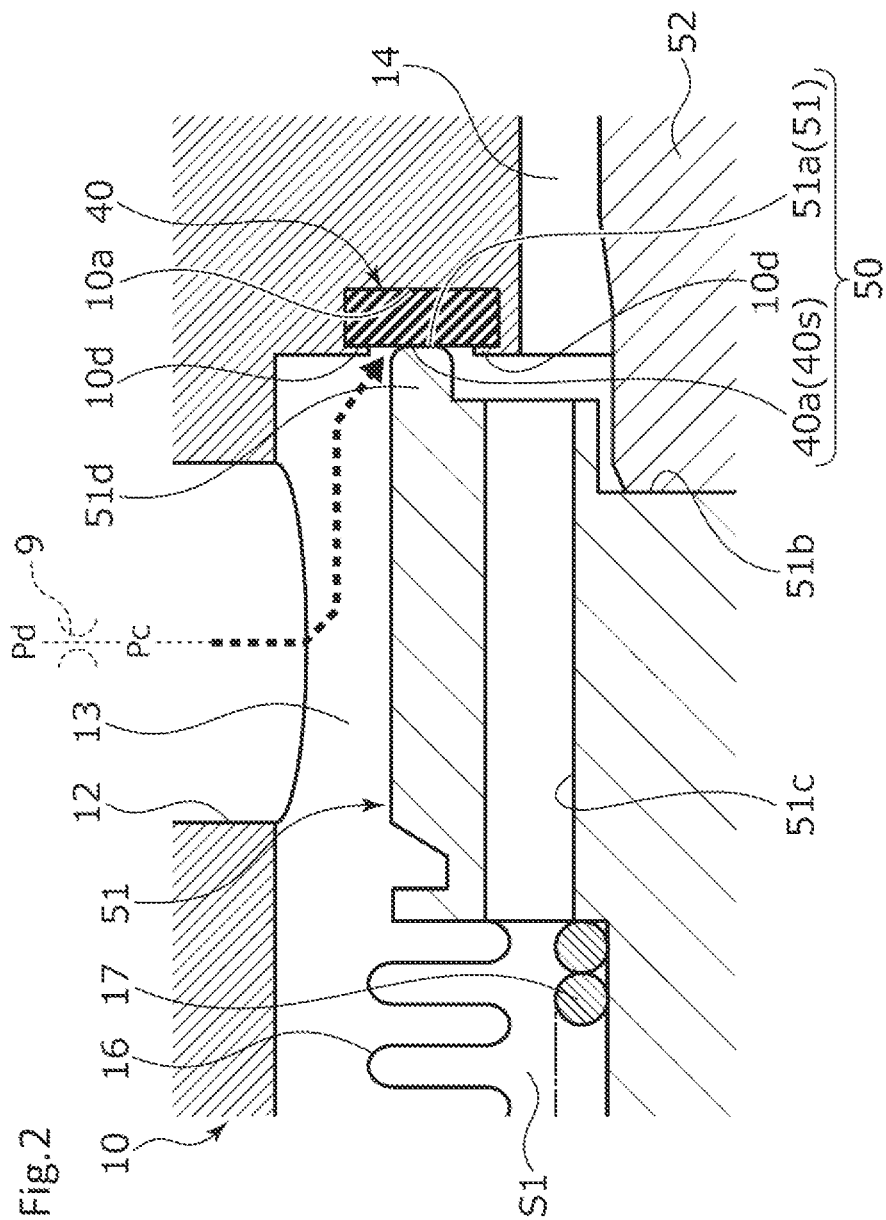
FIG. 2 is an enlarged cross-sectional view illustrating a state where a CS valve is closed in the capacity control valve in the first embodiment.
Figure 3:
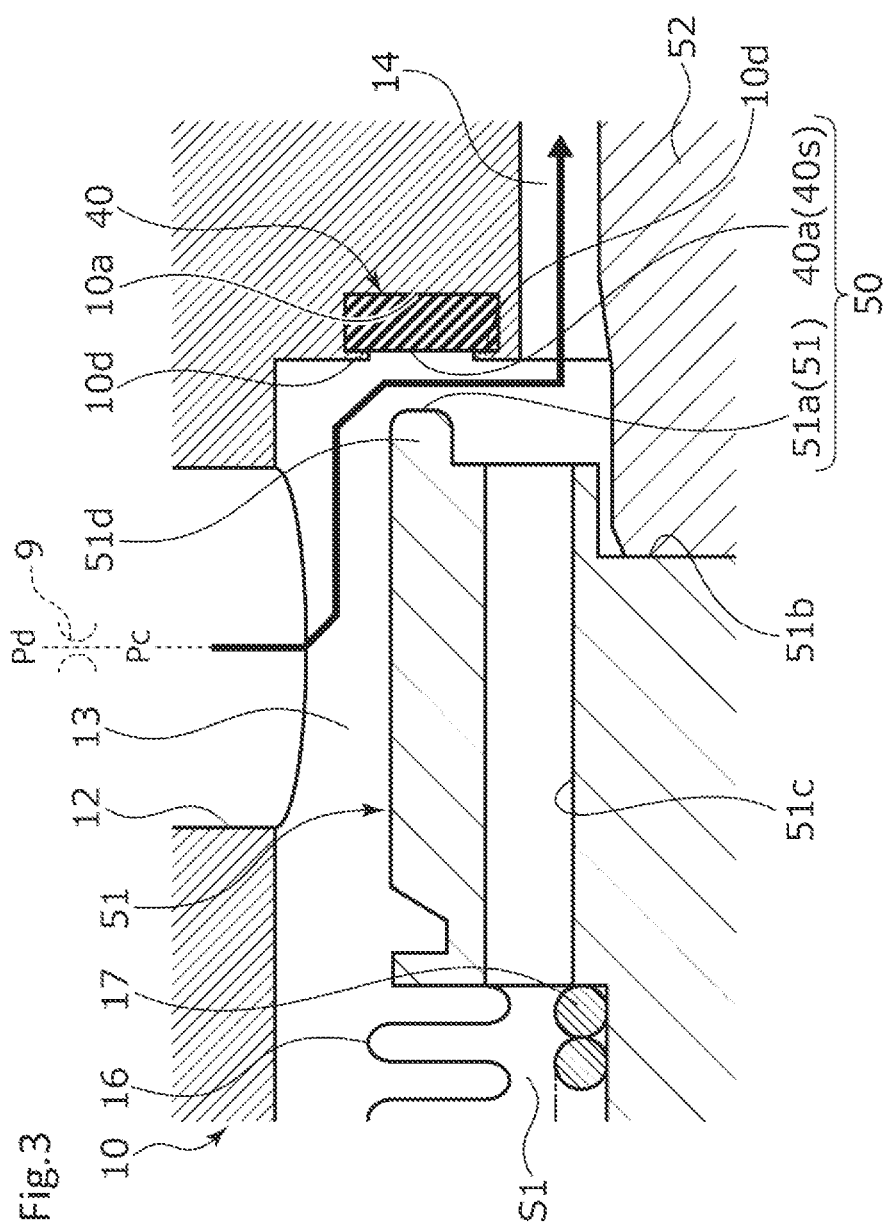
FIG. 3 is an enlarged cross-sectional view illustrating a state where the CS valve is opened in the capacity control valve in the first embodiment.

As illustrated in FIGS. 1 to 3, the CS valve body 51 is made of a metallic material or a resin material, and includes a recessed portion 51*b* at a central portion thereof, the recessed portion 51*b* being open to the right in the axial direction. A rod 52 is disposed through the coil 86 of the solenoid 80. An axially left end portion of the rod 52 is inserted into the recessed portion 51*b* so as to be contactable and separable. In addition, a communication passage 51*c* penetrating through the CS valve body 51 in the axial direction is formed in the CS valve body 51 at a position that is further offset in a radially outward direction than the recessed portion 51*b*. The communication passage 51*c* is formed with a constant cross section. Incidentally, a plurality of the communication passages 51*c* may be provided.

In addition, an annular projection 51*d* protruding to the right in the axial direction is formed on the CS valve body 51 at a position that is further offset in the radially outward direction than the communication passage 51*c*. A tip, namely, an axially right end of the annular projection 51*d* servers as the contact portion 51*a* that comes into contact with and separates from the CS valve seat 40*a* in the axial direction. In addition, the contact portion 51*a* that is the tip of the annular projection 51*d* is formed with a cross-sectional shape in which radially inner and outer sides of the contact portion 51*a* are round chamfered and a flat portion is provided between both round chamfers (refer to FIGS. 2 and 3). Incidentally, the contact portion 51*a* may be formed with a substantially curved cross-sectional shape in which a flat portion is not provided between both round chamfers, or may be C-chamfered instead of being round chamfered. In addition, chamfering is not essential, and a chamfer may be formed only on one of the radially inner and outer sides or may be not formed.

As illustrated in FIGS. 1 to 3, in the valve housing 10, a Ps port 11 as a port penetrating through the valve housing 10 in a radial direction and communicating with the suction chamber of the variable capacity compressor, and a Pc port 12 as a port communicating with the control chamber are formed. The Ps port 11 is formed on an axially right side of the CS valve seat 40*a*, namely, in a valve closing direction to be described later. In addition, the Pc port 12 is formed on an axially left side of the CS valve seat 40*a*, namely, in a valve opening direction to be described later.

A first valve chamber 13 to which the fluid is supplied from the Pc port 12, and a second valve chamber 14 to which the fluid that has passed through the CS valve 50 from the first valve chamber 13 is supplied and which communicates with the Ps port 11 are provided inside the valve housing 10. The first valve chamber 13 is formed by a recessed portion 10*b* that is formed on the axially left side of the CS valve seat 40*a* and that is open to the left in the axial direction, and an opening portion on an axially left side is closed in a sealed manner by a lid member 15.

In addition, a bellows 16 as a biasing member (also referred to as biasing means) for biasing the CS valve body 51 to the right in the axial direction, namely, in the valve closing direction, and a coil spring 17 as another biasing member are disposed in the first valve chamber 13. An axially left end of the bellows 16 is fixed to the lid member 15 in a sealed manner, an axially right end of the bellows 16 is fixed to an axially left end surface of the CS valve body 51 in a sealed manner, and a space S1 is formed inside the bellows 16. Incidentally, the coil spring 17 is a compression spring, and is disposed in the space S1 formed inside the bellows 16.

In addition, the space S1 communicates with the second valve chamber 14 through the communication passage 51*c*, and the fluid in the second valve chamber 14 flows into the space S1. Namely, in a closed state of the CS valve 50, the bellows 16 partitions the space S1 and the first valve chamber 13 off from each other in a sealed manner.

In addition, a recessed portion 10*c* of which a radially inner side of an axially right end is recessed to the left in the axial direction is formed in the valve housing 10. A flange portion 82*d* of a center post 82 is inserted into the recessed portion 10*c* from the right in the axial direction, so that the center post 82 is connected and fixed to the valve housing 10 in a substantially sealed state. Incidentally, an opening end on a solenoid 80 side of the second valve chamber 14 is formed on a radially inner side of a bottom surface of the recessed portion 10*c* of the valve housing 10.

Here, the elastic member 40 will be described. As illustrated in FIGS. 1 to 3, the elastic member 40 is a ring having a rectangular cross section that is made of a material such a rubber or resin having a modulus of elasticity smaller than that of the annular projection 51*d* of the CS valve body 51.

In addition, the elastic member 40 is press-fitted to the annular recessed portion 10*a* from the left in the axial direction, the annular recessed portion 10*a* being recessed to the right in the axial direction in a bottom portion of the recessed portion 10*b* forming the first valve chamber 13 of the valve housing 10, and is crimped and fixed by crimping pieces 10*d* (refer to FIGS. 2 and 3) on radially inner and outer sides formed on opening portion of the annular recessed portion 10*a*. In addition, an exposed portion of an axially left end surface of the elastic member 40 which is formed between the crimping pieces 10*d* on the radially inner and outer sides, namely, a contact surface 40*s* serves as the CS valve seat 40*a*. The contact portion 51*a* at the tip of the annular projection 51*d* of the CS valve body 51 can come into contact with and separate from the contact surface 40*s*.

In addition, the elastic member 40 and the annular recessed portion 10*a* before and after being press-fitted have a rectangular cross section, and have substantially the same dimensions on the radially inner and outer sides and in a thickness direction. Incidentally, the elastic member 40 before being press-fitted may be formed slightly larger or smaller than the annular recessed portion 10*a*.

The contact surface 40*s* of the elastic member 40 is a surface orthogonal to a driving direction of the CS valve body 51, and a width of the contact surface 40*s* in the radial direction is formed larger than a width of the annular projection 51*d* in the radial direction. Accordingly, the contact portion 51*a* at the tip of the annular projection 51*d* can be reliably seated on the CS valve seat 40*a*, and contact between the annular projection 51*d* and the crimping pieces 10*d* on the radially inner and outer sides can be prevented.

As illustrated in FIG. 1, the solenoid 80 mainly includes a casing 81 including an opening portion 81*a* that is open to the left in the axial direction; the center post 82 having a substantially cylindrical shape that is inserted into the opening portion 81*a* of the casing 81 from the left in the axial direction and that is fixed on a radially inner side of the casing 81; the rod 52 which is inserted into the center post 82 to be reciprocatable in the axial direction and of which the axially left end portion is disposed on the axially left side of the CS valve seat 40*a*; the CS valve body 51 press-fitted and fixed to the axially left end portion of the rod 52; a movable iron core 84 to which an axially right end portion of the rod 52 is inserted and fixed; a coil spring 85 as a rod biasing member (also referred to as rod biasing means)

provided on an axially right side of the movable iron core 84 to bias the rod 52 inserted and fixed to the movable iron core 84, to the left in the axial direction, namely, in the valve opening direction; and the coil 86 for excitation wound on an outer side of the center post 82 with a bobbin interposed therebetween. Incidentally, the coil spring 85 is a compression spring.

A recessed portion 81b of which a radially inner side of an axially left end is recessed to the right in the axial direction is formed in the casing 81, and an axially right end portion of the valve housing 10 is inserted and fixed to the recessed portion 81b in a substantially sealed manner.

The center post 82 is made of a rigid body that is a magnetic material such as iron or silicon steel, and includes a cylindrical portion 82b which extends in the axial direction and in which an insertion hole 82c into which the rod 52 is inserted is formed, and the flange portion 82d having an annular shape and extending from an outer peripheral surface of an axially left end portion of the cylindrical portion 82b in the radially outward direction.

In addition, the center post 82 is inserted and fixed to the recessed portion 10c of the valve housing 10 inserted and fixed to the recessed portion 81b of the casing 81, in a substantially sealed manner in a state where an axially right end surface of the flange portion 82d is brought into contact with a bottom surface of the recessed portion 81b of the casing 81 from the left in the axial direction. Namely, the center post 82 is fixed by sandwiching the flange portion 82d between the bottom surface of the recessed portion 81b of the casing 81 and the bottom surface of the recessed portion 10c of the valve housing 10 from both sides in the axial direction.

Next, an opening and closing operation of the capacity control valve V1 will be described.

First, a non-energized state of the capacity control valve V1 will be described. As illustrated in FIGS. 1 and 2, in a non-energized state of the capacity control valve V1, the CS valve body 51 is pressed to the right in the axial direction, namely, in the valve closing direction by biasing forces of the bellows 16 and of the coil spring 17, so that the contact portion 51a at the tip of the annular projection 51d of the CS valve body 51 is seated on the CS valve seat 40a formed on the axially left end surface of the elastic member 40, and the CS valve 50 is closed.

At this time, when an effective pressure-receiving area of the bellows 16 is A, an effective pressure-receiving area of the CS valve body 51 is B, and an axially rightward direction is defined as being positive, a biasing force $F_{bel}$ of the bellows 16, a biasing force $F_{sp1}$ of the coil spring 17, a force $F_{P1}$) due to the control pressure Pc=(P1×(A−B)), a force $F_{P2}$ due to the suction pressure Ps=−(P2×(A−B)), and a biasing force $F_{sp2}$ of the coil spring 85 act on the CS valve body 51. Namely, when the axially rightward direction is defined as being positive, a force $F_{rod}=F_{bel}+F_{sp1}+F_{P1}-F_{P2}-F_{sp2}$ acts on the CS valve body 51.

Specifically, the fluid in the space S1 acts on the axially left end surface of the CS valve body 51, and the fluid in the second valve chamber 14 acts on an axially right end surface of the CS valve body 51. Since the second valve chamber 14 and the space S1 communicate with each other through the communication passage 51c formed in the CS valve body 51, the fluid in the second valve chamber 14 located closer to a valve closing direction side than the CS valve body 51, namely, the fluid of the suction pressure Ps supplied from the Ps port 11 flows into the space S1.

In addition, since the communication passage 51c is a narrowed through-hole, when a slight pressure difference occurs instantaneously between pressure in the space S1 and pressure in the second valve chamber 14, the fluid in the space S1 is unlikely to instantaneously move toward the second valve chamber 14 and is held in the space S1, and a closed state of the CS valve 50 is easily maintained.

In such a manner, the fluid flowing into the space S1 and into the second valve chamber 14 is the fluid of the same suction pressure Ps supplied from the Ps port 11. In addition, in the present embodiment, since the effective pressure-receiving area A of the bellows 16 and the effective pressure-receiving area B of the CS valve body 51 are equal (i.e., A=B), both the forces $F_{P1}$ and ($F_{P2}$) acting on the CS valve body 51 due to the control pressure Pc and to the suction pressure Ps are substantially zero. Namely, when the rightward direction is defined as being positive, a force $F_{rod}=F_{bel}+F_{sp1}-F_{sp2}$ substantially acts on the CS valve body 51.

Next, an energized state of the capacity control valve V1 will be described. As illustrated in FIG. 3, in an energized state of the capacity control valve V1, namely, during normal control or during so-called duty control, when an electromagnetic force $F_{sol}$ generated by the application of an electric current to the solenoid 80 is larger than the force $F_{rod}$ (i.e., $F_{sol}>F_{rod}$), the movable iron core 84 is pulled to a center post 82 side, namely, to the axially left side, and the rod 52 fixed to the movable iron core 84 and the CS valve body 51 held so as to be able to come into contact with and to separate from the rod 52 move together to the left in the axial direction, namely, in the valve opening direction. Accordingly, the contact portion 51a of the CS valve body 51 separates from the CS valve seat 40a formed on the contact surface 40s of the elastic member 40, and the CS valve 50 is opened. In addition, when the solenoid 80 is driven, the movable iron core 84 comes into contact with an axially right side of the center post 82, so that further separation of the CS valve body 51 from the CS valve seat 40a is restricted.

In such a manner, the capacity control valve V1 can control pressure in the control chamber of the variable capacity compressor using a pressure difference between the control pressure Pc and the suction pressure Ps lower than the control pressure Pc due to a valve opening degree of the CS valve 50 that is adjusted by balance between electromagnetic force of the solenoid 80 and the biasing forces of the bellows 16, of the coil spring 17, and of the coil spring 85.

As described above, in the capacity control valve V1 of the first embodiment, even in a case where contaminations are caught between the contact portion 51a at the tip of the annular projection 51d of the CS valve body 51 and the CS valve seat 40a formed on the contact surface 40s of the elastic member 40 when the valve is closed, the elastic member 40 can be elastically deformed to suppress generation of a gap between the contact portion 51a of the CS valve body 51 and the CS valve seat 40a, so that valve leakage can be reduced.

Figure 4:
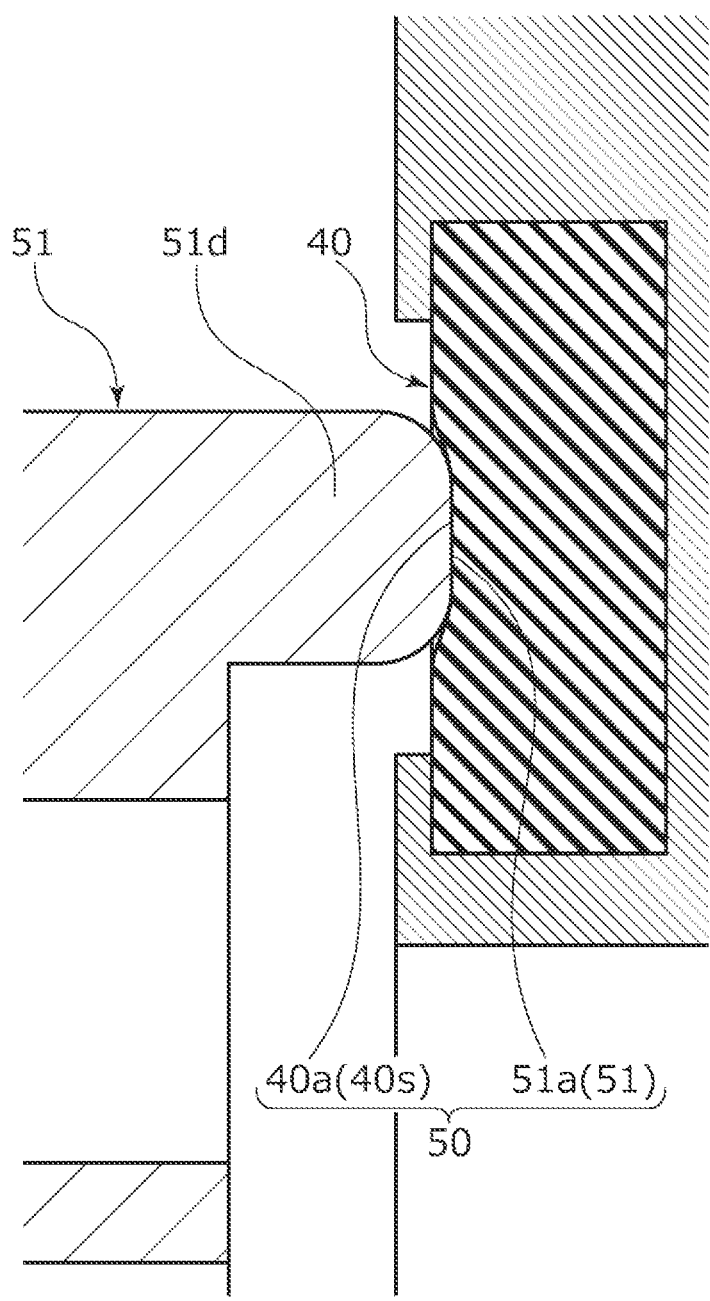
FIG. 4 is an enlarged cross-sectional view illustrating a state where an elastic member is elastically deformed when the CS valve is closed in the first embodiment.

In addition, since the elastic member 40 is formed to have a modulus of elasticity, namely, a Young's modulus smaller than that of the annular projection 51d of the CS valve body 51, when the valve is closed, even in a case where contaminations are caught between the contact portion 51a of the CS valve body 51 and the CS valve seat 40a formed on the contact surface 40s of the elastic member 40, the elastic member 40 can be reliably and elastically deformed to suppress generation of a gap between the contact portion 51a of the CS valve body 51 and the CS valve seat 40a. Further, regardless of whether or not contaminations are caught, when the valve is closed, since the contact portion 51a at the tip of the annular projection 51d elastically deforms the elastic member 40 and is slightly buried (refer to FIG. 4), it is difficult for the CS valve body 51 to relatively move with respect to the contact surface 40s of the elastic member 40 in a valve closed state of the CS valve 50, so that sealability is enhanced.

Since the contact surface 40s of the elastic member 40 on which the CS valve seat 40a is formed is a surface orthogonal to the driving direction of the CS valve body 51, when the valve is closed, it is difficult for the annular projection 51d to further relatively move with respect to the contact surface 40s of the elastic member 40, so that sealability is enhanced. In addition, when the valve is closed, since the relative movement of the annular projection 51d with respect to the contact surface 40s of the elastic member 40 is suppressed, damage to the contact surface 40s of the elastic member 40 caused by the annular projection 51d is suppressed, so that sealability can be maintained over a long period of time. Incidentally, in the capacity control valve V1 of the present embodiment, since the CS valve body 51 and the rod 52 are held so as to be able to come into contact with and to separate from each other, and the CS valve body 51 is supported by the bellows 16 fixed to the valve housing 10 via the lid member 15 on the axially left side of the CS valve seat 40a, the structure is such that the CS valve body 51 easily moves when the valve is closed, but as described above, the relative movement of the annular projection 51d with respect to the contact surface 40s of the elastic member 40 is suppressed, sealability or durability is guaranteed.

Further, since corners on the radially inner and outer sides of the tip portion of the annular projection 51d are round chamfered, and the tip portion is formed with a substantially curved cross-sectional shape, damage to the contact surface 40s of the elastic member 40 caused by the annular projection 51d is further suppressed.

When materials of the contact portion of the valve body and of the valve seat are a combination of metals as in the related art, since not only a gap is likely to be generated due to contaminations being caught, but also a gap is likely to be generated by an offset between the contact portion of the valve body and the valve seat in a closed state of the valve, valve leakage is likely to occur, but as described above, in the first embodiment, since the CS valve seat 40a is formed on the contact surface 40s of the elastic member 40, this problem can be solved.

In addition, since the valve housing 10 is provided with the annular recessed portion 10a, and the elastic member 40 press-fitted to the annular recessed portion 10a is crimped and fixed by the crimping pieces 10d on the radially inner and outer sides, the elastic member 40 inserted into the annular recessed portion 10a can be prevented from coming off. Incidentally, since the elastic member 40 is press-fitted to the annular recessed portion 10a or is crimped and fixed by the crimping pieces 10d on the radially inner and outer sides, the elastic member 40 may be deformed in the radial direction to cause the contact surface 40s to slightly bulge to the left in the axial direction, so that when the valve is closed, the contact portion 51a at the tip of the annular projection 51d is easily buried in the contact surface 40s of the elastic member 40.

In addition, since the elastic member 40 has a rectangular cross section, even when the annular projection 51d comes into contact with the contact surface 40s of the elastic member 40 at any position, stable elasticity can be provided.

In addition, the CS valve body 51 is configured separately from the rod 52 forming the solenoid 80, and the rod 52 is biased in the valve opening direction by the coil spring 85, so that the CS valve body 51 and the rod 52 are held so as to be able to come into contact with and to separate from each other. When the valve is closed, the contact portion 51a of the CS valve body 51 is seated on the CS valve seat 40a formed on the contact surface 40s of the elastic member 40, and at the same time, the CS valve body 51 is not affected by an inertial force of the rod 52 acting to the right in the axial direction. For this reason, an excessive load is not applied to the annular projection 51d or to the elastic member 40. Namely, when the valve is closed, since only the biasing forces of the bellows 16 and of the coil spring 17 act on the annular projection 51d or on the elastic member 40, an excessive load is not applied to the annular projection 51d or to the elastic member 40, so that damage thereto can be prevented.

In addition, since the coil spring 17 disposed inside the bellows 16 is a compression spring, a structure on the solenoid 80 side of the capacity control valve V1 is simplified, and the contact portion 51a at the tip of the annular projection 51d of the CS valve body 51 is seated on the CS valve seat 40a while the structure is such that an axis of the CS valve body 51 is easily offset, so that good sealability can be obtained.

Incidentally, the crimping piece 10d may be provided on at least one of the radially inner and outer sides of the valve housing 10.

Second Embodiment

A capacity control valve as a valve according to a second embodiment of the present invention will be described with reference to FIG. 5. Incidentally, a description of configurations that are the same as the configurations of and are duplicated in the first embodiment will be omitted.

Figure 5:
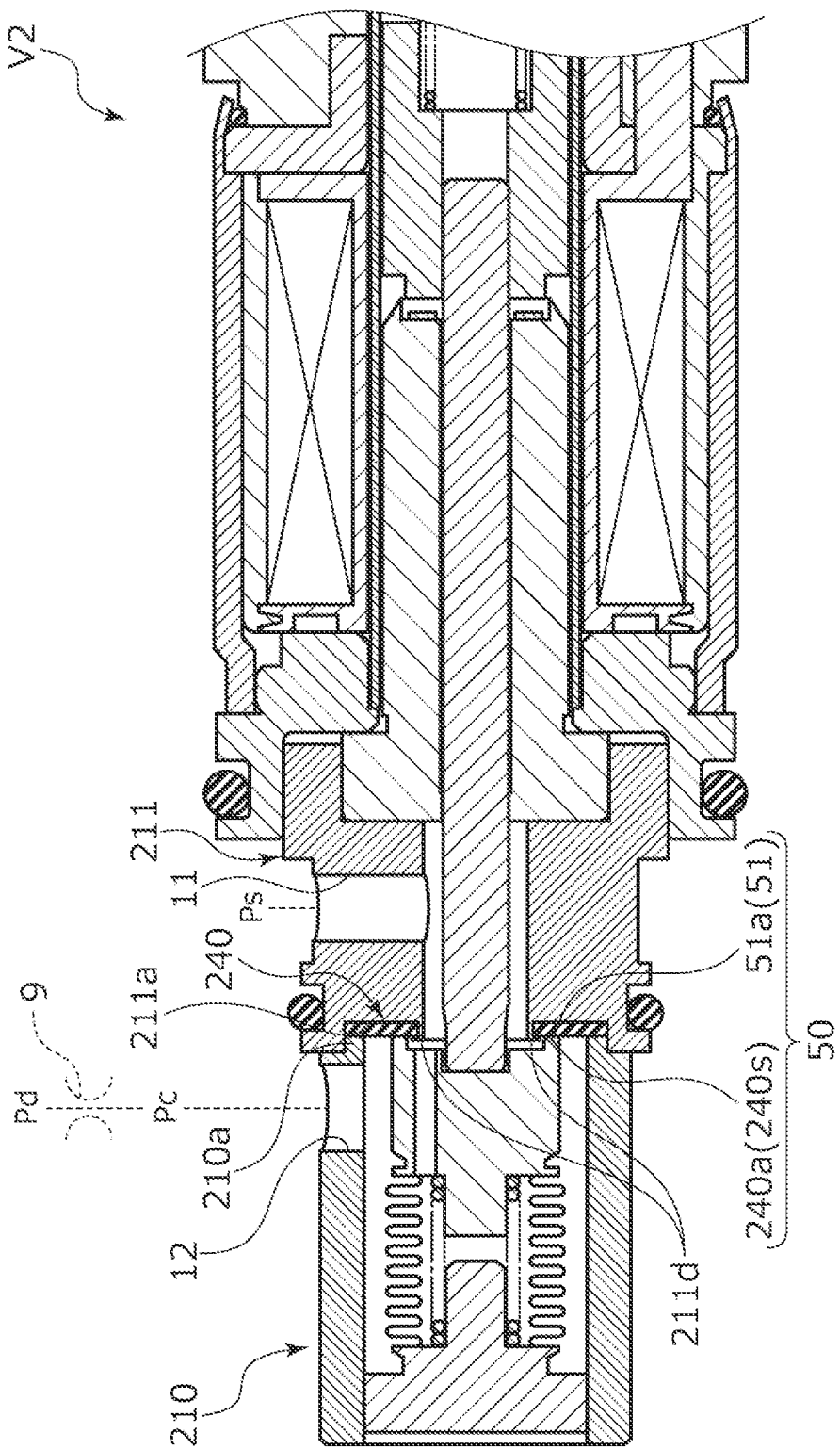
FIG. 5 is an enlarged cross-sectional view illustrating a structure of a capacity control valve as a valve according to a second embodiment of the present invention.

As illustrated in FIG. 5, in a capacity control valve V2 in the second embodiment, a valve housing is configured such that a first valve housing 210 and a second valve housing 211 are integrally connected and fixed to each other in a substantially sealed state by externally fitting an axially left end portion of the second valve housing 211 to an axially right end portion of the first valve housing 210 from the right in the axial direction. The Pc port 12 communicating with the control chamber of the variable capacity compressor is formed in the first valve housing 210. In addition, the Ps port 11 communicating with the suction chamber of the variable capacity compressor is formed in the second valve housing 211.

An annular recessed portion 211a recessed to the right in the axial direction is formed in the axially left end portion of the second valve housing 211, and an elastic member 240 is press-fitted to the annular recessed portion 211a from the left in the axial direction, and is crimped and fixed by a crimping piece 211d on a radially inner side formed on an opening portion of the annular recessed portion 211a. Further, when the first valve housing 210 and the second valve housing 211 are connected and fixed to each other, an annular protrusion 210a having a rectangular cross section that is formed on the axially right end portion of the first valve housing 210 is pressed against a radially outer side of an axially left end surface of the elastic member 240, so that the elastic member 240 is sandwiched and held between the first valve housing 210 and the second valve housing 211.

In addition, a CS valve seat 240a as a valve seat is formed on the axially left end surface of the elastic member 240, the CS valve seat 240a being formed of an exposed portion of the axially left end surface formed between the annular protrusion 210a of the first valve housing 210 and the crimping piece 211d of the second valve housing 211, namely, of a contact surface 240s.

According to this configuration, in the capacity control valve V2 of the second embodiment, since the elastic member 240 is sandwiched and held between the first valve housing 210 and the second valve housing 211 that are integrally connected and fixed to each other, the elastic member 240 inserted into the annular recessed portion 211a can be prevented from coming off.

In addition, compared to when the crimping pieces 10d are formed on the radially inner and outer sides inside the valve housing 10 as in the first embodiment, in the second embodiment, the valve housing is divided, so that processing of the first valve housing 210 and the second valve housing 211 for holding the elastic member 240 is facilitated.

Incidentally, in the second embodiment, since the elastic member 240 can be held by the annular protrusion 210a of the first valve housing 210, the crimping piece 211d of the second valve housing 211 may not be formed. Accordingly, only a recess of the annular recessed portion 211a may be formed in the second valve housing 211, and the second valve housing 211 is more easily processed.

Third Embodiment

A capacity control valve as a valve according to a third embodiment of the present invention will be described with reference to FIGS. 6 to 8. Incidentally, a description of configurations that are the same as the configurations of and are duplicated in the first embodiment will be omitted.

Figure 6:
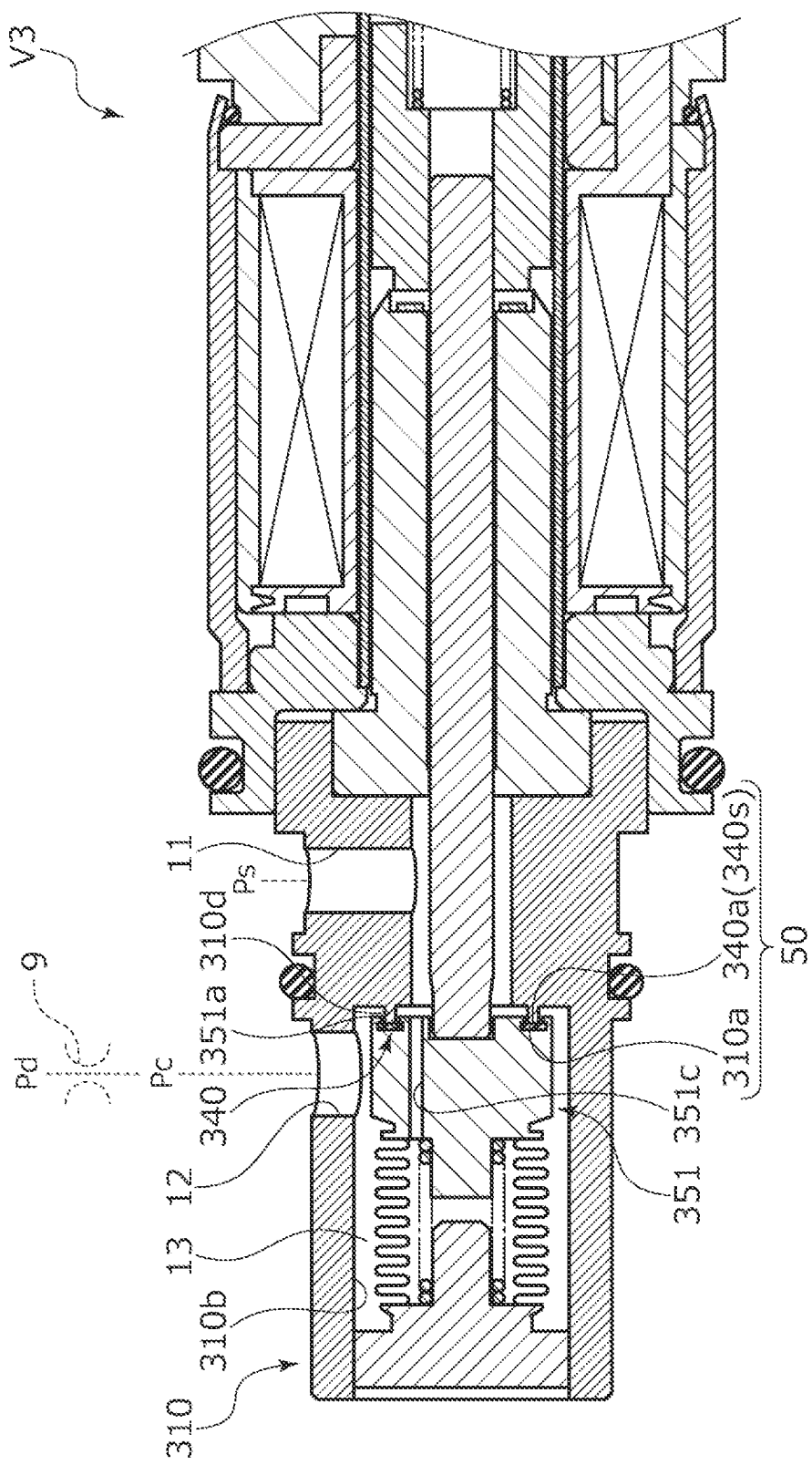
FIG. 6 is an enlarged cross-sectional view illustrating a structure of a capacity control valve as a valve according to a third embodiment of the present invention.

As illustrated in FIG. 6, in a capacity control valve V3 of the third embodiment, the CS valve 50 is formed of a CS valve body 351 as a valve body and a CS valve seat 310a as a valve seat at a tip of an annular projection 310d of a valve housing 310, and a contact portion 340a formed on a contact surface 340s of an elastic member 340 that is press-fitted and crimped and fixed to an annular recessed portion 351a formed at an axially right end of the CS valve body 351 comes into contact with and separates from the CS valve seat 310a in the axial direction, to open and close the CS valve 50.

Figure 7:
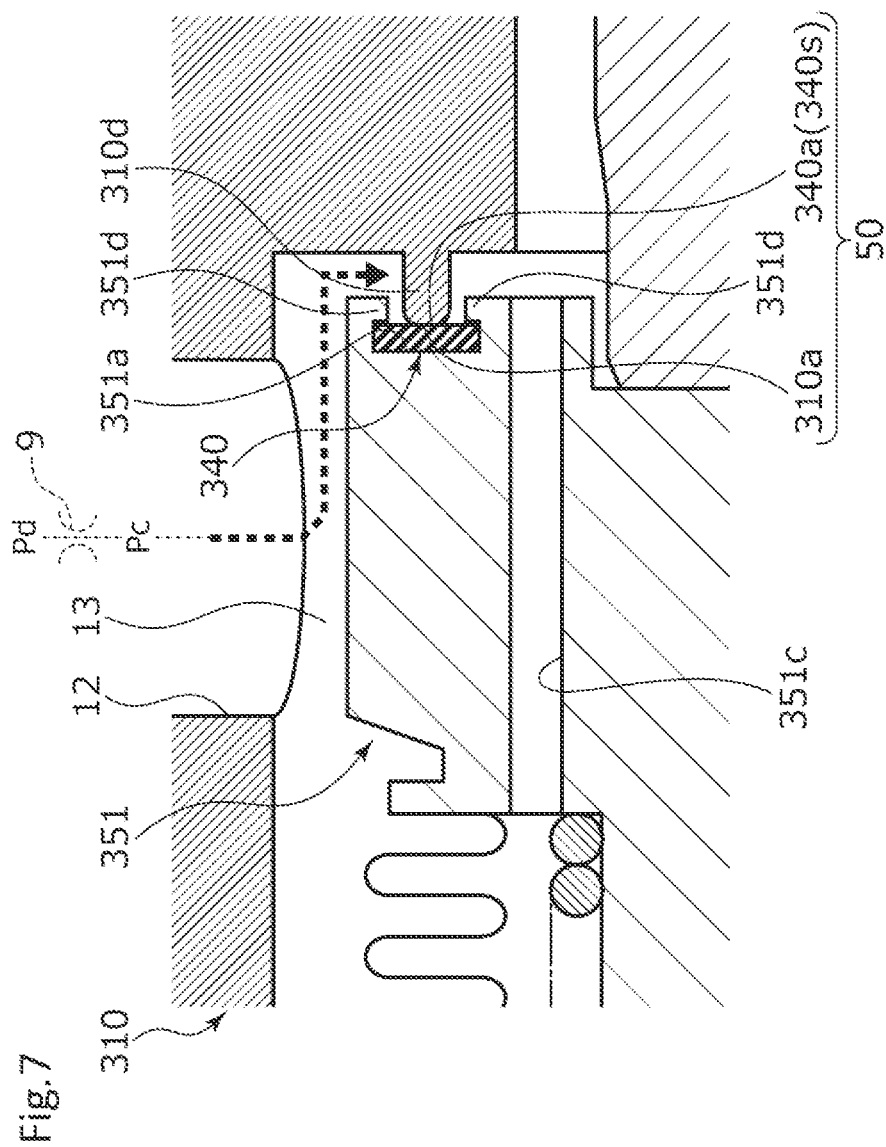
FIG. 7 is an enlarged cross-sectional view illustrating a state where a CS valve is closed in the capacity control valve in the third embodiment.
Figure 8:
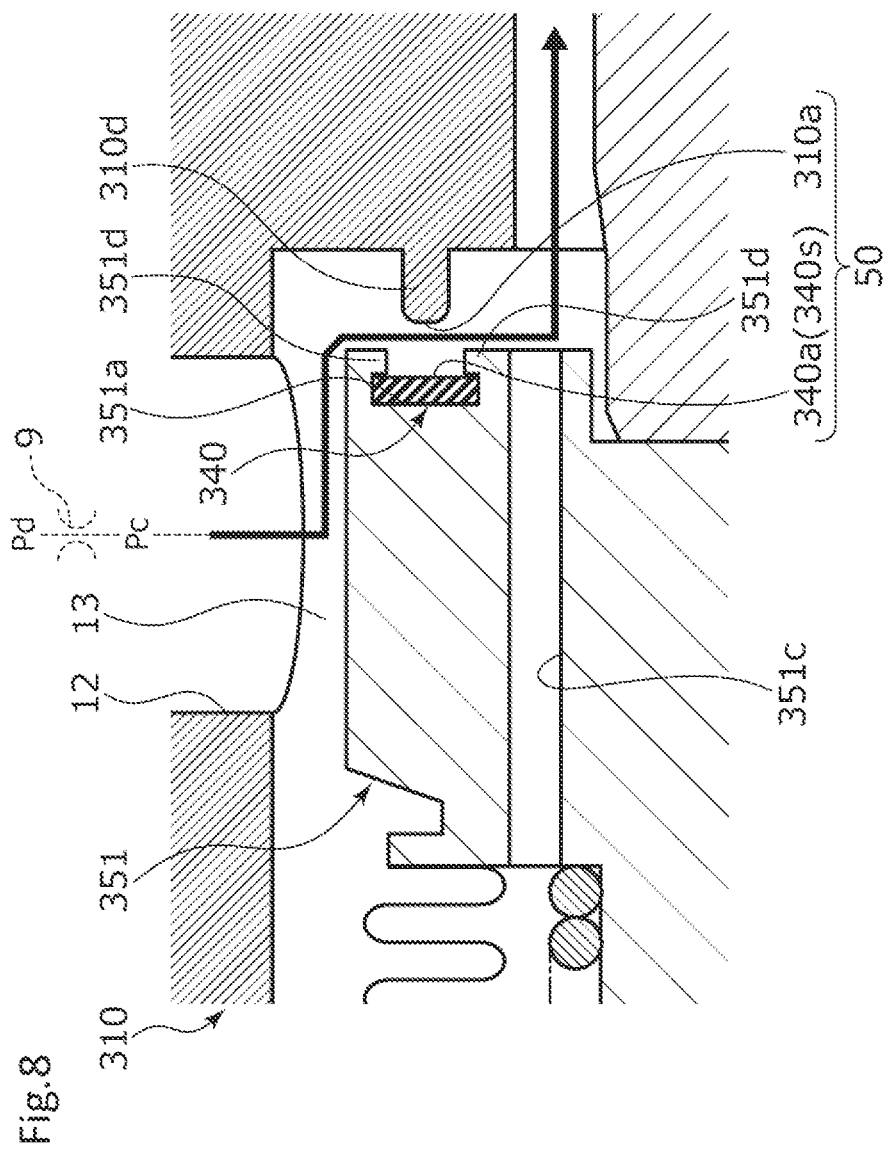
FIG. 8 is an enlarged cross-sectional view illustrating a state where the CS valve is opened in the capacity control valve inf the third embodiment.

As illustrated in FIGS. 6 to 8, the CS valve body 351 is made of a metallic material, and the annular recessed portion 351a recessed to the left in the axial direction is formed in the CS valve body 351 at a position that is much further offset in the radially outward direction than a communication passage 351c.

The elastic member 340 is press-fitted to the annular recessed portion 351a of the CS valve body 351 from the right in the axial direction, and is crimped and fixed by crimping pieces 351d (refer to FIGS. 7 and 8) on radially inner and outer sides formed on an opening portion of the annular recessed portion 351a. In addition, the contact portion 340a of the CS valve body 351 is formed on an axially right end surface of the elastic member 340, the contact portion 340a being formed of an exposed portion of the axially right end surface formed between the crimping pieces 351d on the radially inner and outer sides, namely, of the contact surface 340s. The contact portion 340a can come into contact with and separate from the CS valve seat 310a at the tip of the annular projection 310d of the valve housing 310.

As illustrated in FIGS. 6 to 8, the annular projection 310d that is formed on a bottom portion of a recessed portion 310b forming the first valve chamber 13 and that protrudes to the left in the axial direction is formed on the valve housing 310.

The CS valve seat 310a from which the contact portion 340a of the CS valve body 351 comes into contact with and separates in the axial direction is formed at the tip, namely, an axially left end of the annular projection 310d.

According to this configuration, in the capacity control valve V3 of the third embodiment, since the elastic member 340 is provided on the CS valve body 351 that is a member to be assembled to the valve housing 310, processing of the CS valve body 351 for holding the elastic member 340 is facilitated.

Incidentally, the crimping piece 351d may be provided on at least one of the radially inner and outer sides of the CS valve body 351.

The embodiments of the present invention have been described above with reference to the drawings, but the specific configurations are not limited to the embodiments, and changes or additions that are made without departing from the scope of the present invention are also included in the present invention.

For example, in the embodiments, a mode in which one of the CS valve seat and the contact portion of the CS valve body facing the annular projection in the axial direction is formed of an elastic member has been described, but the present invention is not limited to the configuration, and both the contact portion of the CS valve body and the CS valve seat may be formed of elastic members. In this case, only the annular projection may be formed of an elastic member. In addition, it is preferable that the elastic member on which the contact surface is formed has a modulus of elasticity smaller than that of the elastic member forming the annular projection. Incidentally, both the contact portion of the CS valve body and the CS valve seat may be formed of elastic members having the same modulus of elasticity.

In addition, the contact surface of the elastic member may not be a surface orthogonal to the driving direction of the CS valve body, and may be formed as, for example, a tilted surface or a curved surface.

In addition, in the embodiments, the valve housing and the CS valve body have been described as being made of a metallic material or a resin material, but it is preferable that a member by which the elastic member is held through crimping and fixing is made of a metallic material. In addition, for example, when a member by which the elastic member is held is made of a resin material, instead of the crimping piece, a portion that becomes a pressing piece that prevents the elastic member from coming off may be fleshed out.

In addition, in the embodiments, the elastic member has been described as being press-fitted to the annular recessed portion, but the elastic member may be simply inserted into the annular recessed portion. In addition, the elastic member is not limited to being disposed inside the annular recessed portion, and for example, may be fixed to the valve housing or to the CS valve body by another member such as an adhesive agent or a bolt.

Figure 9:
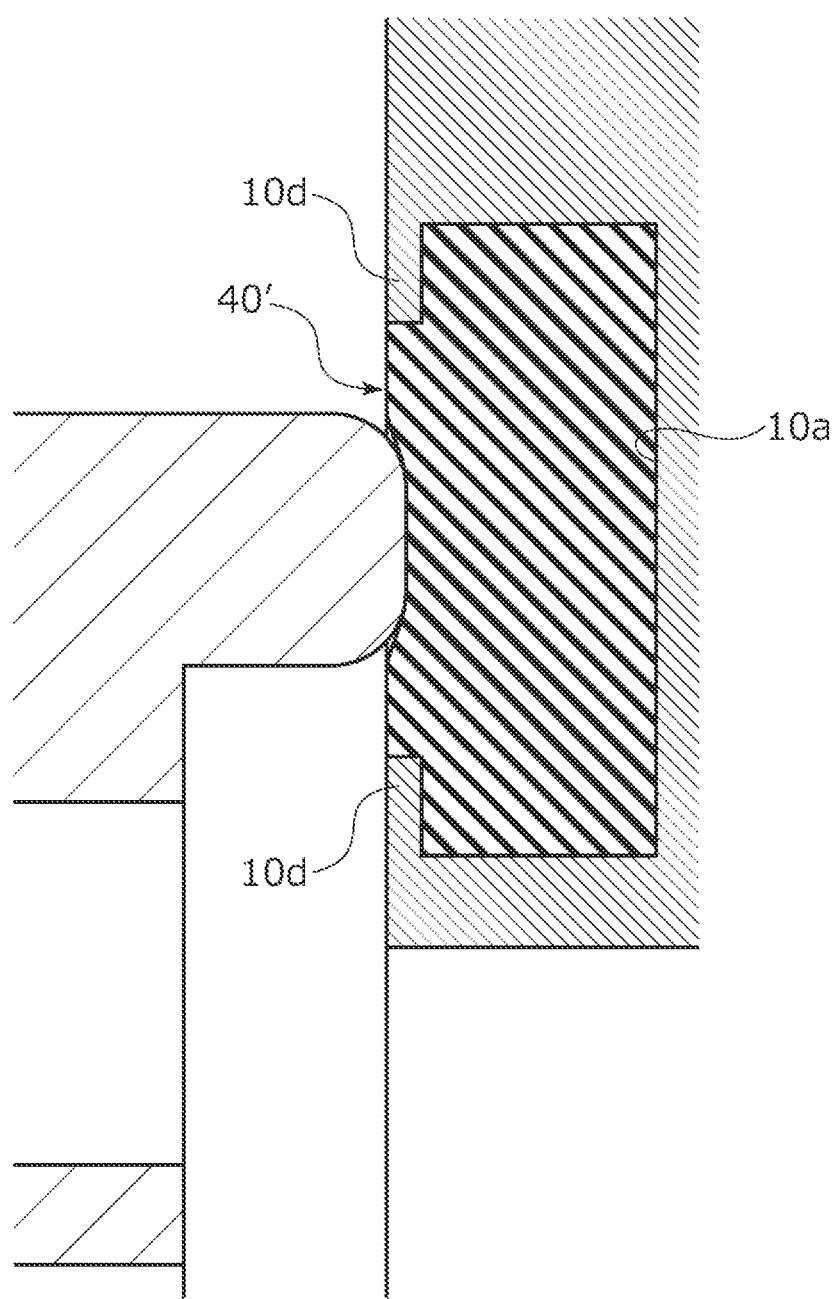
FIG. 9 is a view illustrating a modification example of the elastic member.

In addition, the elastic member is not limited to having a rectangular cross section, and the cross-sectional shape may be, for example, a circular shape, a triangular shape, a T shape, a V shape, an X shape, etc. For example, as illustrated in FIG. 9, when an elastic member 40' is formed with a T-shaped cross section, the elastic member 40' may be crimped and fixed by pressing step portions provided in the elastic member 40' press-fitted to the annular recessed portion 10a, using the crimping pieces 10d on the radially inner and outer side.

In addition, in the embodiments, the CS valve body has been described as being configured as a member separate from the rod disposed through the coil of the solenoid, and as being able to come into contact with and to separate from the rod, but the present invention is not limited to the configuration, and the CS valve body and the rod that are separate members may be integrally connected and fixed to each other. In addition, the CS valve body and the rod may be integrally formed. In this case, the coil spring that biases the rod in the valve opening direction may not be provided.

In addition, since the coil spring is disposed inside the bellows, the bellows itself may not have a biasing force.

In addition, the coil spring may not be disposed inside the bellows.

In addition, in the embodiments, a mode in which the effective pressure-receiving area A of the bellows and the effective pressure-receiving area B of the CS valve body are the same (i.e., A=B) has been described, but the present invention is not limited to this mode, and the effective pressure-receiving area A may be set slightly larger than the effective pressure-receiving area B (i.e., A>B) such that a closed state of the CS valve can be reliably maintained, or the effective pressure-receiving area B may be set slightly larger than the effective pressure-receiving area A (i.e., A<B) such that the CS valve is easily opened. Namely, an influence of pressure of the fluid acting on both sides the CS valve body in a movement direction may be reduced.

In addition, the capacity control valve of the embodiments has been described as a CS valve, but the present invention is not limited to the configuration, and the capacity control valve may be a DC valve that opens and closes a flow passage between the Pd port and the Pc port.

In addition, the drive source may be a member other than the solenoid.

REFERENCE SIGNS LIST

9 Fixed orifice
10 Valve housing
10a Annular recessed portion
10d Crimping piece
11 Ps port (port)
12 Pc port (port)
13 First valve chamber
14 Second valve chamber
15 Lid member
16 Bellows (biasing member)
17 Coil spring (biasing member)
40 Elastic member
40a CS valve seat (valve seat)
40s Contact surface
50 CS valve
51 CS valve body (valve body)
51a Contact portion
51d Annular projection
52 Rod
80 Solenoid (drive source)
85 Coil spring (rod biasing member)
210 First valve housing (valve housing)
210a Annular protrusion
211 Second valve housing (valve housing)
211a Annular recessed portion
211d Crimping piece
240 Elastic member
240a CS valve seat (valve seat)
240s Contact surface
310 Valve housing
310a CS valve seat (valve seat)
310d Annular projection
340 Elastic member
340a Contact portion
340s Contact surface
351 CS valve body (valve body)
351a Annular recessed portion
351d Crimping piece
S1 Space
V1, V2, V3 Capacity control valve (valve)

The invention claimed is:

1. A valve, comprising:
a valve housing in which a port through which a fluid passes is formed;
a valve body configured to be driven by a drive source;
a valve seat on which a contact portion of the valve body is seated;
a biasing member configured to bias the valve body in a valve closing direction of the valve; and
a bellows having a first end portion fixed to the valve body and a second end portion fixed to the valve housing, the first end portion and the second end portion being opposed to each other in an axial direction,
wherein the valve seat is formed of an elastic member which is press-fitted into an annular recessed portion formed in the valve housing,
the annular recessed portion is defined by an annular bottom surface, and an inner annular side wall surface and an outer annular side wall surface which are opposed to each other in a radial direction,
the contact portion of the valve body is formed of an annular projection which is protruded toward the valve seat from a central part of an axially end surface of the valve body on a valve seat side and which has a contact surface formed by a flat tip surface orthogonal to the axial direction, and
the valve body is provided with a through-hole which communicates with a radially inner side space of the contact portion and an inner space of the bellows.

2. The valve according to claim 1,
the elastic member is formed to have a modulus of elasticity smaller than a modulus of elasticity of the annular projection.

3. The valve according to claim 2,
wherein an inner diameter side end of the elastic member is crimped and fixed.

4. The valve according to claim 2,
wherein the elastic member has a rectangular cross section.

5. The valve according to claim 2,
wherein the valve body is separately configured to come into contact with and to separate from a rod forming the drive source, and
the rod is biased in a valve opening direction by a rod biasing member.

6. The valve according to claim 2,
wherein the biasing member is a compression spring.

7. The valve according to claim 1,
wherein an inner diameter side end of the elastic member is crimped and fixed.

8. The valve according to claim 7,
wherein the elastic member has a rectangular cross section.

9. The valve according to-claim 7,
wherein the valve body is separately configured to come into contact with and to separate from a rod forming the drive source, and
the rod is biased in a valve opening direction by a rod biasing member.

10. The valve according to claim 7,
wherein the biasing member is a compression spring.
11. The valve according to claim 1,
wherein the elastic member has a rectangular cross section.
12. The valve according to claim 11,
wherein the valve body is separately configured to come into contact with and to separate from a rod forming the drive source, and
the rod is biased in a valve opening direction by a rod biasing member.
13. The valve according to claim 11,
wherein the biasing member is a compression spring.
14. The valve according to claim 1,
wherein the valve body is separately configured to come into contact with and to separate from a rod forming the drive source, and
the rod is biased in a valve opening direction by a rod biasing member.
15. The valve according to claim 1,
wherein the biasing member is a compression spring.

\* \* \* \* \*